(12) United States Patent
Sudo et al.

(10) Patent No.: US 9,487,704 B2
(45) Date of Patent: *Nov. 8, 2016

(54) NEMATIC LIQUID CRYSTAL COMPOSITION AND LIQUID CRYSTAL DISPLAY ELEMENT USING SAME

(71) Applicant: DIC CORPORATION, Tokyo (JP)

(72) Inventors: Go Sudo, Kitaadachi-gun (JP); Shotaro Kawakami, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/780,909

(22) PCT Filed: Mar. 20, 2014

(86) PCT No.: PCT/JP2014/057740
§ 371 (c)(1),
(2) Date: Sep. 28, 2015

(87) PCT Pub. No.: WO2014/156947
PCT Pub. Date: Oct. 2, 2014

(65) Prior Publication Data
US 2016/0060526 A1  Mar. 3, 2016

(30) Foreign Application Priority Data

Mar. 28, 2013 (JP) .................... 2013-069066

(51) Int. Cl.
| | | |
|---|---|---|
| G02F 1/1333 | (2006.01) | |
| C09K 19/34 | (2006.01) | |
| C09K 19/20 | (2006.01) | |
| C09K 19/30 | (2006.01) | |
| C09K 19/32 | (2006.01) | |
| C09K 19/02 | (2006.01) | |
| C09K 19/04 | (2006.01) | |

(52) U.S. Cl.
CPC ....... *C09K 19/3402* (2013.01); *C09K 19/0208* (2013.01); *C09K 19/20* (2013.01); *C09K 19/3066* (2013.01); *C09K 19/322* (2013.01); *C09K 2019/0466* (2013.01); *C09K 2019/3004* (2013.01); *C09K 2019/3422* (2013.01)

(58) Field of Classification Search
CPC .............. C09K 19/3402; C09K 19/20; C09K 19/3066; C09K 19/322; C09K 19/0208; C09K 2019/0466; C09K 2019/3004; C09K 2019/3422; G02F 1/1333
USPC ............ 252/299.01, 299.6, 299.63; 428/1.1; 349/182
See application file for complete search history.

(56) References Cited

U.S. PATENT DOCUMENTS

| | | | | |
|---|---|---|---|---|
| 9,039,929 B2 * | 5/2015 | Kaneoya | ............... | C09K 19/20 252/299.01 |
| 2009/0064739 A1 | 3/2009 | Trischberger et al. | | |

FOREIGN PATENT DOCUMENTS

| | | |
|---|---|---|
| JP | 2008-037918 A | 2/2008 |
| JP | 2008-038018 A | 2/2008 |
| JP | 2009-067780 A | 4/2009 |
| JP | 2010-275390 A | 12/2010 |
| JP | 2011-052120 A | 3/2011 |
| WO | 2009/156118 A1 | 12/2009 |
| WO | 2010/089092 A1 | 8/2010 |
| WO | 2013/018796 A1 | 2/2013 |

OTHER PUBLICATIONS

International Search Report dated Jun. 17, 2014, issued in counterpart Application No. PCT/JP2014/057740 (3 pages).

\* cited by examiner

*Primary Examiner* — Geraldina Visconti
(74) *Attorney, Agent, or Firm* — Westerman, Hattori, Daniels & Adrian, LLP

(57) ABSTRACT

There is provided a positive liquid crystal composition that has a dielectric anisotropy useful as a liquid crystal display material. The liquid crystal composition has a liquid crystal phase in a wide temperature range, a low viscosity, a good solubility at low temperatures, a high resistivity, and a high voltage holding ratio, and is stable to heat and light. Use of this liquid crystal composition can provide a liquid crystal display element that has high displaying quality and is less likely to undergo displaying failures such as burn-in and dropping marks. A liquid crystal display element that employs the liquid crystal composition is useful for an active-matrix-driving liquid crystal display element and can be used for a liquid crystal display element that employs the TN mode, the IPS mode, the FFS mode, or the like.

14 Claims, No Drawings

NEMATIC LIQUID CRYSTAL COMPOSITION AND LIQUID CRYSTAL DISPLAY ELEMENT USING SAME

TECHNICAL FIELD

The present invention relates to a nematic liquid crystal composition that is useful as a liquid crystal display material and has a positive dielectric anisotropy ($\Delta\in$) and a liquid crystal display element using this nematic liquid crystal composition.

BACKGROUND ART

Liquid crystal display elements have come to be used in watches, calculators, various measurement instruments, automobile panels, word processors, electronic organizers, printers, computers, televisions, clocks, advertising boards, and the like. Typical examples of the liquid crystal display mode include a TN (twisted nematic) mode, an STN (super twisted nematic) mode, and a vertical alignment mode and an IPS (in-plane switching) mode that use TFTs (thin film transistors). Liquid crystal compositions that are used in these liquid crystal display elements are required to be stable to external stimuli such as moisture, air, heat, and light, stay in a liquid crystal phase in a temperature range as wide as possible around room temperature, exhibit a low viscosity, and operate at a low driving voltage. Such a liquid crystal composition is constituted by several to several tens of compounds in order to optimize dielectric anisotropy ($\Delta\in$), refractive index anisotropy ($\Delta n$), and the like for individual display elements.

Vertical alignment (VA) mode displays use liquid crystal compositions that have a negative $\Delta\in$. Horizontal alignment displays employing the TN mode, the STN mode, the IPS (in-plane switching) mode, or the like use liquid crystal compositions that have a positive $\Delta\in$. There is also a report on a driving mode in which a liquid crystal composition that has a positive $\Delta\in$ is vertically aligned during no application of voltage and application of a horizontal electric field allows displaying. Thus, there is an increasing demand for a liquid crystal composition having a positive $\Delta\in$. On the other hand, for all driving modes, there is a demand for low-voltage driving, high-speed response, and a wide operation temperature range. Specifically, there is a demand for $\Delta\in$ that is positive and the absolute value of which is large, and for a low viscosity ($\eta$) and a high nematic phase-isotropic liquid phase transition temperature ($T_{ni}$). On the basis of predetermined $\Delta n \times d$, which is the product of $\Delta n$ and cell gap (d), $\Delta n$ of the liquid crystal composition needs to be appropriately adjusted so as to be in a range in accordance with the cell gap. In addition, in the case where liquid crystal display elements are applied to televisions and the like, high-speed response is a priority. Accordingly, liquid crystal compositions having a low rotational viscosity ($\gamma 1$) are required.

A disclosed example of the configuration of a liquid crystal composition intended to provide high-speed response is a liquid crystal composition in which a compound that is represented by a formula (A-1) or (A-2) and is a liquid crystal compound having a positive $\Delta\in$ and (B) that is a liquid crystal compound having a neutral $\Delta\in$ are combined. Features of such liquid crystal compositions that the liquid crystal compound having a positive $\Delta\in$ has a —CF$_2$O— structure and the liquid crystal compound having a neutral $\Delta\in$ has an alkenyl group, are well known in the field of liquid crystal compositions (Patent Literatures 1 to 4).

[Chem. 1]

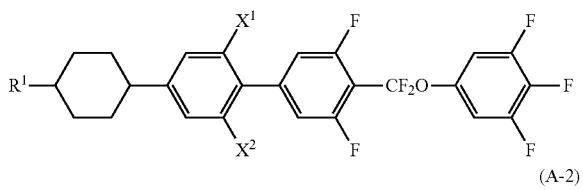
(A-1)

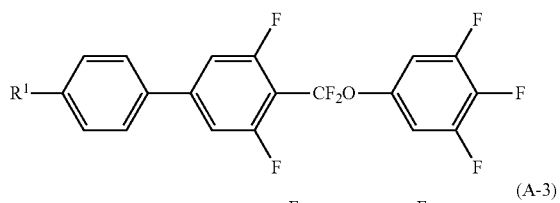
(A-2)

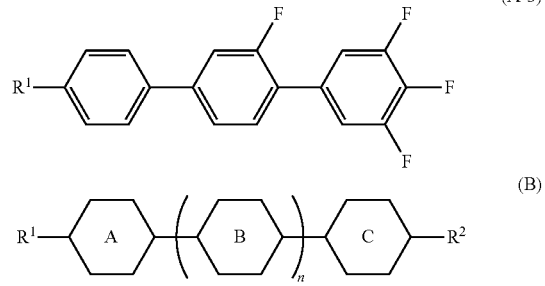
(A-3)

(B)

Meanwhile, as liquid crystal display elements are used in wider applications, the way of using the elements and the method of producing the elements have considerably changed. In order to adapt to such changes, optimization of characteristics other than known basic property values has come to be required. Specifically, for liquid crystal display elements using liquid crystal compositions, the VA mode, the IPS mode, and the like have come to be commonly used. Regarding the size of liquid crystal display elements, display elements having a very large size of 50 inches or more have come to be put into practical use and are being used. With the increase in substrate size, the main process of injecting a liquid crystal composition between substrates has changed from the conventional vacuum injection process to the one drop fill (ODF) process. Thus, a problem has arisen: dropping marks formed during dropping of liquid crystal compositions on substrates cause degradation of displaying quality.

In addition, in the step of producing a liquid crystal display element by an ODF process, an optimal amount of liquid crystal needs to be dropped in accordance with the size of the liquid crystal display element. A large deviation of the injection amount from the optimal value upsets the designed balance between the refractive index of and driving electric field of the liquid crystal display element, resulting in displaying failures such as occurrence of unevenness or poor contrast. In particular, for small liquid crystal display elements that are used in large quantities for recently popular smart phones, the optimal injection amount of liquid crystal is small so that it is difficult to adjust, to be within a certain range, the deviation of the amount from the optimal value. Accordingly, in order to maintain a high yield of liquid crystal display elements, for example, it is also necessary that the liquid crystal is less influenced by rapid pressure changes or impact within a dropping apparatus during dropping of the liquid crystal and the liquid crystal can be continuously dropped with stability for a long period of time.

As described above, for a liquid crystal composition used for an active-matrix-driving liquid crystal display element driven in TFT elements or the like, there has been a demand for a development in which, while features and performance such as high-speed response required for the liquid crystal display element are maintained and conventionally emphasized features of having a high resistivity and a high voltage holding ratio and being stable to external stimuli such as light and heat are ensured, the method for producing the liquid crystal display element needs to be considered.

CITATION LIST

Patent Literature

PTL 1: Japanese Unexamined Patent Application Publication No. 2008-037918
PTL 2: Japanese Unexamined Patent Application Publication No. 2008-038018
PTL 3: Japanese Unexamined Patent Application Publication No. 2010-275390
PTL 4: Japanese Unexamined Patent Application Publication No. 2011-052120

SUMMARY OF INVENTION

Technical Problem

An object of the present invention is to provide a liquid crystal composition that has a positive dielectric anisotropy ($\Delta\varepsilon$), a liquid crystal phase in a wide temperature range, a low viscosity, a good solubility at low temperatures, a high resistivity, and a high voltage holding ratio, and is stable to heat and light; and to provide, by using this liquid crystal composition, a liquid crystal display element in a high yield that employs the TN mode, the IPS mode, the FFS mode, or the like, has high displaying quality, and is less likely to undergo displaying failures such as burn-in and dropping marks.

Solution to Problem

The inventors of the present invention studied various liquid crystal compounds and various chemical substances and, as a result, have found that a combination of specific liquid crystal compounds allows the above-described object to be achieved. Thus, the present invention has been accomplished.

The present invention provides a liquid crystal composition including, as a first component, a compound represented by a formula (Ix)

[Chem. 2]

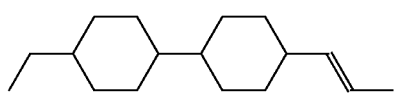

(Ix)

in a content of 3% to 60% by mass; and includes, as a second component, a component (A) having a positive dielectric anisotropy ($\Delta\varepsilon$). The present invention also provides a liquid crystal display element that employs the liquid crystal composition.

Advantageous Effects of Invention

A liquid crystal composition having a positive dielectric anisotropy ($\Delta\varepsilon$) according to the present invention has very low viscosity ($\eta$) and rotational viscosity ($\gamma 1$), and a good solubility at low temperatures, and is little changed in terms of resistivity and voltage holding ratio (VHR) by heat or light. Accordingly, the liquid crystal composition is highly practical. A liquid crystal display element employing the TN mode, the IPS mode, the FFS mode, or the like and employing this liquid crystal composition can achieve high-speed response. In addition, the liquid crystal composition can exhibit its performance with stability in steps of producing liquid crystal display elements, so that occurrence of displaying failures due to the steps is suppressed and the liquid crystal display elements can be produced in a high yield. Therefore, the liquid crystal composition is very useful.

DESCRIPTION OF EMBODIMENTS

The inventors of the present invention studied various bicyclohexyl derivatives, fluorobenzene derivatives, and fluoronaphthalene derivatives and, as a result, have found that a combination of specific compounds allows the above-described object to be achieved. Thus, the present invention has been accomplished.

A liquid crystal composition according to the present invention contains, as a first component, a compound represented by a formula (Ix). The content of the compound represented by the formula (Ix) is 3% to 60% by mass, preferably 5% to 50% by mass, more preferably 5% to 40% by mass, particularly preferably 10% to 30% by mass. More specifically, in a case where the viscosity ($\eta$) or the rotational viscosity ($\gamma 1$) is adjusted to be low, the content is preferably 20% to 60% by mass; and, in a case where suppression of deposition at low temperatures is a priority, the content is preferably 10% to 30% by mass. In a case where solubility at low temperatures is intended to be ensured, the content is preferably 10% to 40% by mass.

A liquid crystal composition according to the present invention contains, as a second component, a compound having a positive dielectric anisotropy ($\Delta\varepsilon$). This positive dielectric anisotropy ($\Delta\varepsilon$) means that the absolute value of the dielectric anisotropy ($\Delta\varepsilon$) is more than 2. The content of the component (A) having a positive $\Delta\varepsilon$ is preferably 10% to 90% by mass, more preferably 15% to 70% by mass, particularly preferably 15% to 50% by mass.

The compound used as the component (A) is a compound having a dielectric anisotropy ($\Delta\varepsilon$) of 2 or more, preferably a compound having 2.5 or more, more preferably a compound having 3 or more, and particularly preferably a compound having 3.5 or more. Incidentally, the dielectric anisotropy ($\Delta\varepsilon$) of the compound is determined by extrapolation on the basis of a measured dielectric anisotropy ($\Delta\varepsilon$) of a composition prepared by adding the compound to a liquid crystal composition having a dielectric anisotropy ($\Delta\varepsilon$) of about 0 at 25° C.

The component (A) serving as the second component preferably contains a compound having a naphthalene skeleton and represented by a general formula (Na) or a general formula (Nb).

[Chem. 3]

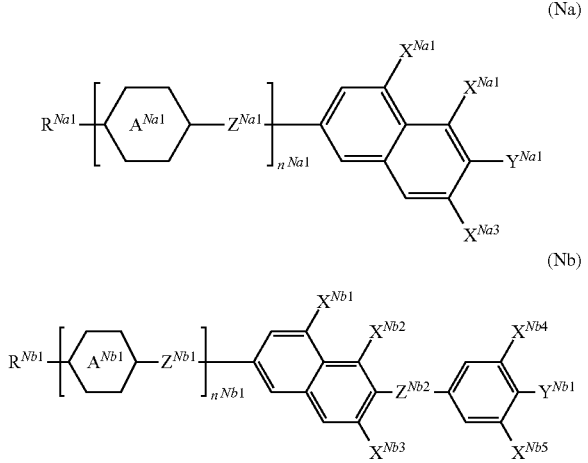

In the formulae, $R^{Na1}$ and $R^{Nb1}$ each independently represent an alkyl group having 1 to 8 carbon atoms or an alkenyl group having 2 to 8 carbon atoms in which one or non-adjacent two or more —$CH_2$— in the groups may each be independently substituted with —C≡C—, —O—, —CO—, —COO—, or —OCO—; preferably, $R^{Na1}$ and $R^{Nb1}$ each independently represent an alkyl group having 1 to 5 carbon atoms or an alkenyl group having 2 to 5 carbon atoms.

The rings $A^{Na1}$ and $A^{Nb1}$ each independently represent a 1,4-cyclohexylene group (one or non-adjacent two or more —$CH_2$— in the group may be substituted with —O— or —S—) or a 1,4-phenylene group (one or non-adjacent two or more —CH= in the group may be substituted with —N=). Hydrogen atoms in the groups may each be independently substituted with a cyano group, a fluorine atom, or a chlorine atom. Preferred groups are a 1,4-cyclohexylene group, a tetrahydropyrane-2,5-diyl group, a 1,4-phenylene group, a 3-fluoro-1,4-phenylene group, and a 3,5-difluoro-1,4-phenylene group.

$Z^{Na1}$, $Z^{Nb1}$, and $Z^{Nb2}$ each independently represent a single bond, —$CH_2CH_2$—, —$(CH_2)_4$—, —$OCH_2$—, —$CH_2O$—, —$OCF_2$—, —$CF_2O$—, —COO—, —OCO—, or —C≡C—; more preferably, a single bond, —$CH_2CH_2$—, —$CH_2O$—, or —$CF_2O$—.

$n^{Na1}$ represents 1, 2, 3, or 4. In a case where $n^{Na1}$ represents 2, 3, or 4 and a plurality of rings $A^{Na1}$ are present, these may be the same or different. Similarly, in a case where a plurality of $Z^{Na1}$ are present, these may be the same or different. In a case where an improvement in Tni is a priority, $n^{Na1}$ preferably represents 2, 3, or 4. In a case where an improvement in response speed is a priority, $n^{Na1}$ preferably represents 1 or 2.

$n^{Nb1}$ represents 0, 1, 2, or 3. In a case where $n^{Nb1}$ represents 2, 3, or 4 and a plurality of rings $A^{Nb1}$ are present, these may be the same or different. Similarly, in a case where a plurality of $Z^{Nb1}$ are present, these may be the same or different. In a case where an improvement in Tni is a priority, $n^{Nb1}$ preferably represents 1, 2, or 3. In a case where an improvement in response speed is a priority, $n^{Nb1}$ preferably represents 0 or 1.

$X^{Na1}$, $X^{Na2}$, $X^{Na3}$, $X^{Nb1}$, $X^{Nb2}$, $X^{Nb3}$, $X^{Nb4}$, and $X^{Nb5}$, each independently represent a hydrogen atom, a chlorine atom, or a fluorine atom.

$X^{Na1}$ preferably represents a hydrogen atom. At least one of $X^{Na2}$ and $X^{Na3}$ preferably represents a fluorine atom and, more preferably, both of them represent fluorine atoms.

$X^{Nb1}$ preferably represents a hydrogen atom. At least one of $X^{Nb2}$ and $X^{Nb3}$ preferably represents a fluorine atom and, more preferably, both of them represent fluorine atoms.

At least one of $X^{Nb4}$ and $X^{Nb5}$ preferably represents a fluorine atom and, more preferably, both of them represent fluorine atoms.

$Y^{Na1}$ and $Y^{Nb1}$ each independently represent a fluorine atom, a chlorine atom, a cyano group, a trifluoromethyl group, a fluoromethoxy group, a difluoromethoxy group, a trifluoromethoxy group, or a 2,2,2-trifluoroethyl group; preferably a fluorine atom, a trifluoromethyl group, a fluoromethoxy group, a difluoromethoxy group, or a trifluoromethoxy group; still more preferably a fluorine atom, a trifluoromethyl group, or a trifluoromethoxy group.

The component (A) serving as the second component preferably contains a compound represented by a general formula (Pa).

[Chem. 4]

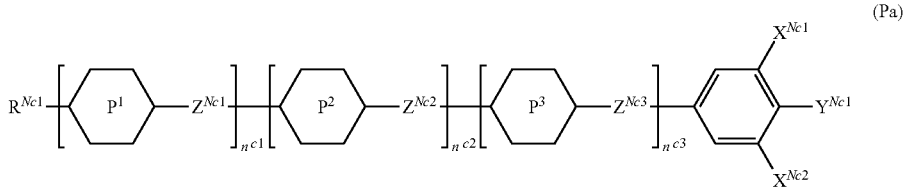

In the formula, $R^{Nc1}$ represents an alkyl group having 1 to 8 carbon atoms or an alkenyl group having 2 to 8 carbon atoms in which one or non-adjacent two or more —$CH_2$— in the groups may each be independently substituted with —C≡C—, —O—, —CO—, —COO—, or —OCO—. $R^{Nc1}$ preferably represents an alkyl group having 1 to 5 carbon atoms or an alkenyl group having 2 to 5 carbon atoms.

The rings $P^1$, $P^2$ and $P^3$ each independently represent a 1,4-cyclohexylene group (one or non-adjacent two or more —$CH_2$— in the group may be substituted with —O— or —S—) or a 1,4-phenylene group (one or non-adjacent two or more —CH= in the group may be substituted with —N=) and hydrogen atoms in the groups may each be independently substituted with a cyano group, a fluorine atom, or a chlorine atom. Preferably, the rings $P^1$, $P^2$, and $P^3$ each independently represent a 1,4-cyclohexylene group, a tetrahydropyrane-2,5-diyl group, a 1,4-phenylene group, a 3-fluoro-1,4-phenylene group, or a 3,5-difluoro-1,4-phenylene group.

$Z^{Nc1}$, $Z^{Nc2}$, and $Z^{Nc3}$ each independently represent a single bond, —$CH_2CH_2$—, —$(CH_2)_4$—, —$OCH_2$—, —CH$_2$O—, —OCF$_2$—, —CF$_2$O—, —COO—, —OCO—, or —C≡C—; more preferably a single bond, —CH$_2$CH$_2$—, —CH$_2$O—, or —CF$_2$O—. More preferably, any one of Z$^{Nc1}$, Z$^{Nc2}$, and Z$^{Nc3}$ that are present represents a single bond.

n$^{c1}$, n$^{c2}$, and n$^{c3}$ each independently represent 0, 1, or 2. n$^{c1}$+n$^{c2}$+n$^{c3}$ represents 1 to 5, more preferably 4 or less, particularly preferably 3 or less.

X$^{Nc1}$ and X$^{Nc2}$ each independently represent a hydrogen atom, a chlorine atom, or a fluorine atom.

Y$^{Nc1}$ represents a fluorine atom, a chlorine atom, a cyano group, a trifluoromethyl group, a fluoromethoxy group, a difluoromethoxy group, a trifluoromethoxy group, or a 2,2,2-trifluoroethyl group; preferably a fluorine atom, a trifluoromethyl group, a fluoromethoxy group, a difluoromethoxy group, or a trifluoromethoxy group; more preferably, a fluorine atom, a trifluoromethyl group, or a trifluoromethoxy group.

The compound represented by the general formula (Na) is preferably a compound selected from a compound group represented by general formulae (Na01) to (Na12).

[Chem. 5]

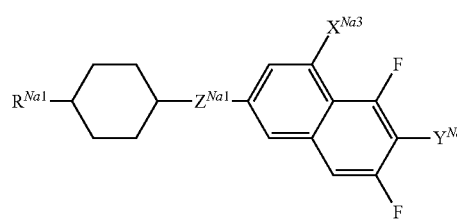
(Na01)

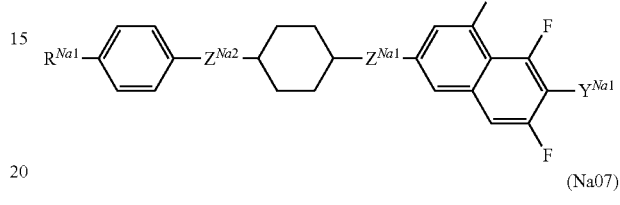
(Na02)

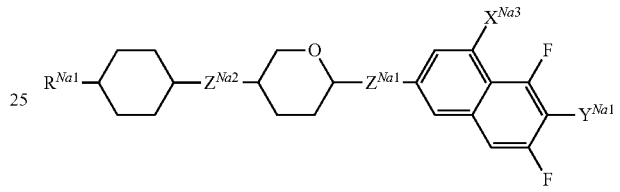
(Na03)

[Chem. 6]

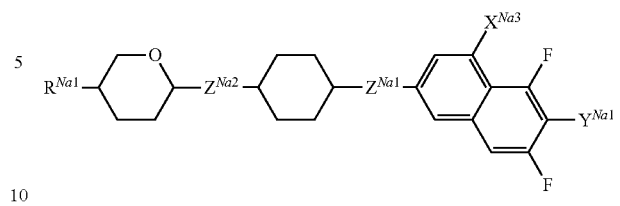
(Na04)

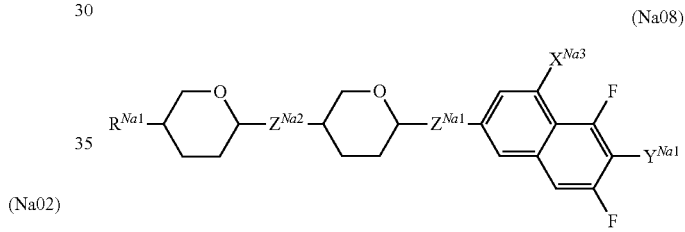
(Na05)

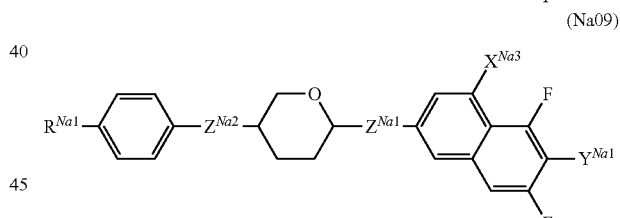
(Na06)

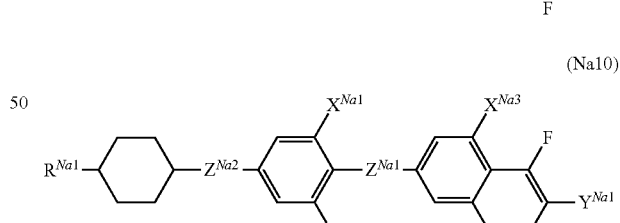
(Na07)

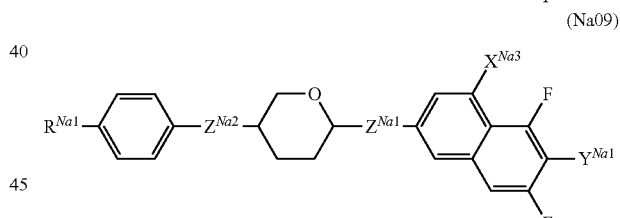
(Na08)

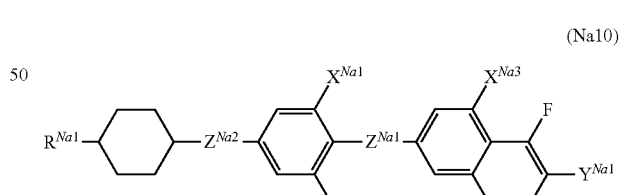
(Na09)

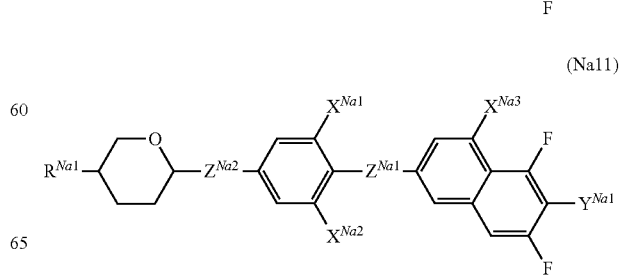
(Na10)

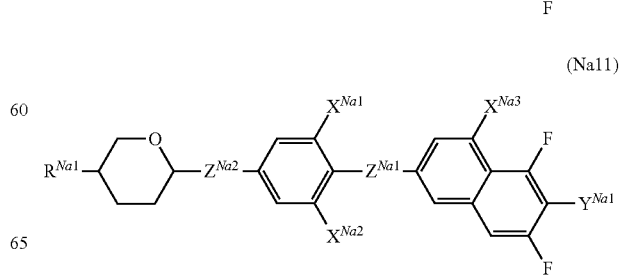
(Na11)

-continued (Na12)
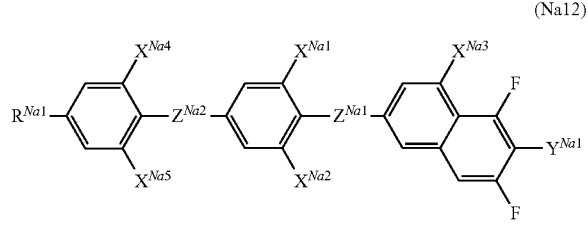

In the formulae, $R^{Na1}$ represents an alkyl group having 1 to 8 carbon atoms or an alkenyl group having 2 to 8 carbon atoms in which one or non-adjacent two or more —$CH_2$— in the groups may each be independently substituted with —C≡C—, —O—, —CO—, —OCO—, or —OCO—. $R^{Na1}$ preferably represents an alkyl group having 1 to 5 carbon atoms or an alkenyl group having 2 to 5 carbon atoms.

$Z^{Na1}$ and $Z^{Na2}$ each independently represent a single bond, —$CH_2CH_2$—, —$(CH_2)_4$—, —$CH_2O$—, —$OCF_2$—, —$CF_2O$—, —COO—, —OCO—, or —C≡C—, more preferably, a single bond, —$CH_2CH_2$—, —$CH_2O$—, or —$CF_2O$—.

$X^{Na1}$ to $X^{Na5}$ each independently represent a hydrogen atom, a chlorine atom, or a fluorine atom.

$Y^{Na1}$ represents a fluorine atom, a chlorine atom, a cyano group, a trifluoromethyl group, a fluoromethoxy group, a difluoromethoxy group, a trifluoromethoxy group, or a 2,2,2-trifluoroethyl group; preferably, a fluorine atom, a trifluoromethyl group, a fluoromethoxy group, a difluoromethoxy group, or a trifluoromethoxy group; more preferably, a fluorine atom, a trifluoromethyl group, or a trifluoromethoxy group.

The compound represented by the general formula (Nb) is preferably selected from a compound group represented by general formulae (Nb1) to (Nb16).

[Chem. 7]

(Nb01)
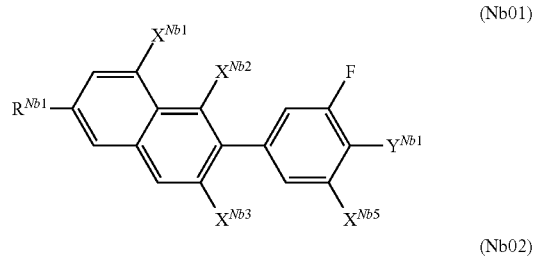

(Nb02)
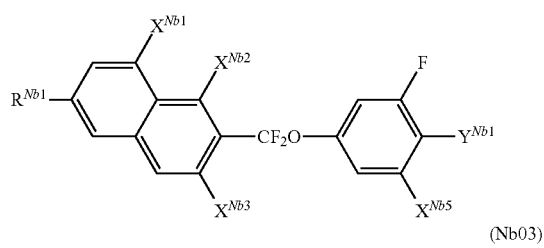

(Nb03)
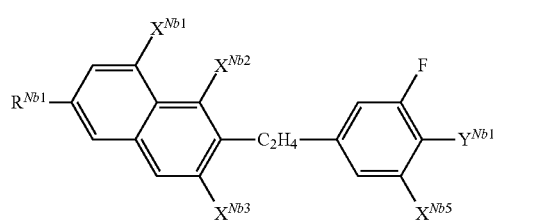

(Nb04)
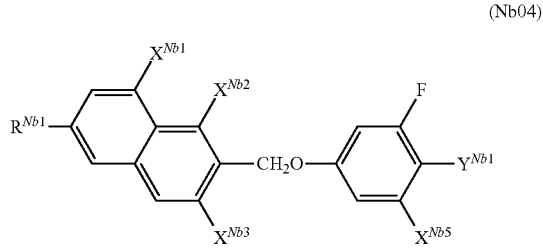

(Nb05)
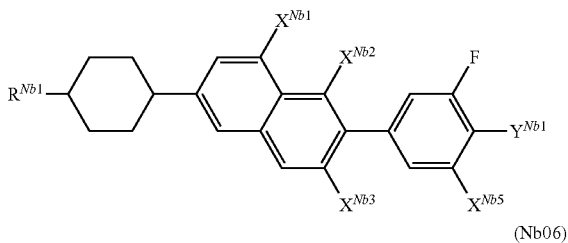

(Nb06)
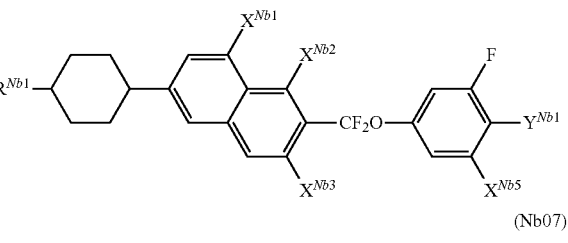

(Nb07)
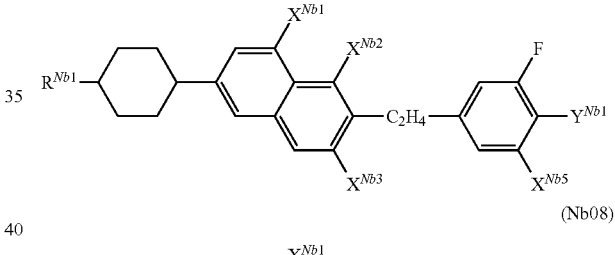

(Nb08)
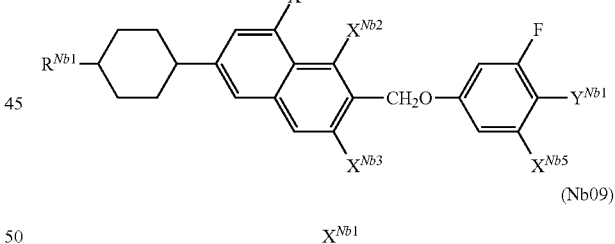

(Nb09)
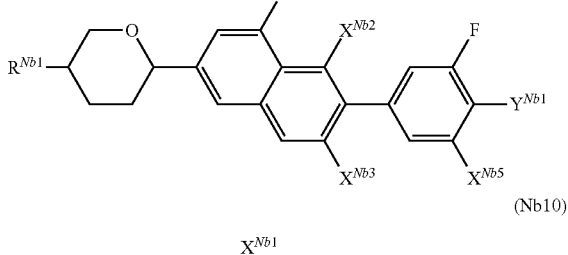

(Nb10)
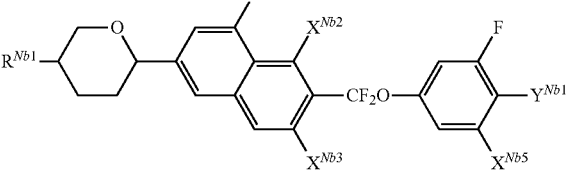

-continued

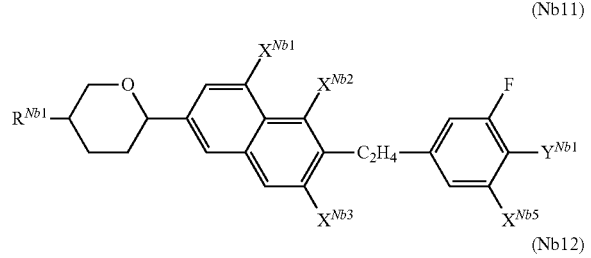
(Nb11)

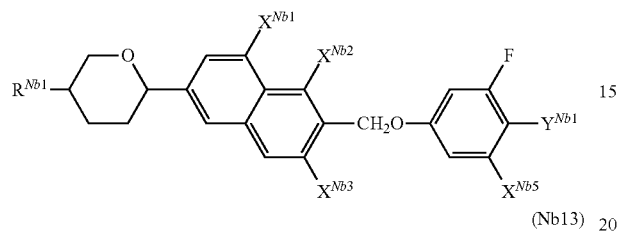
(Nb12)

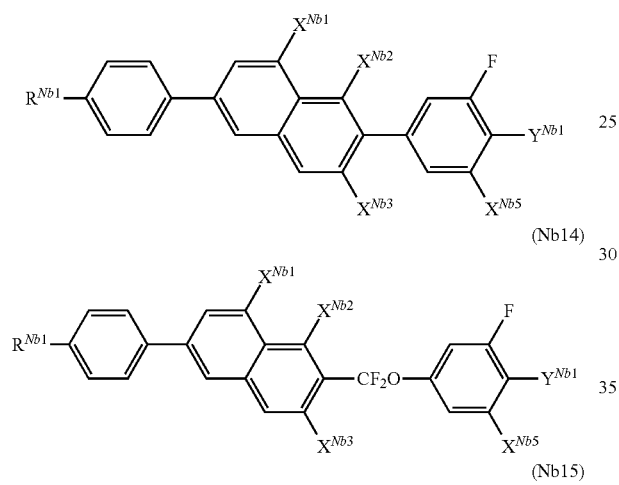
(Nb13)

(Nb14)

(Nb15)

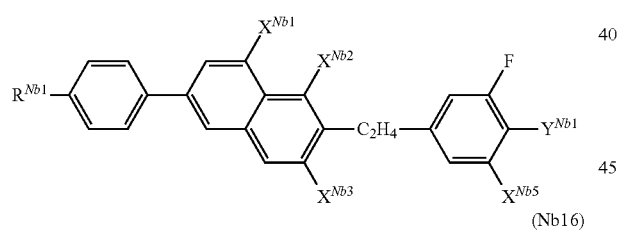
(Nb16)

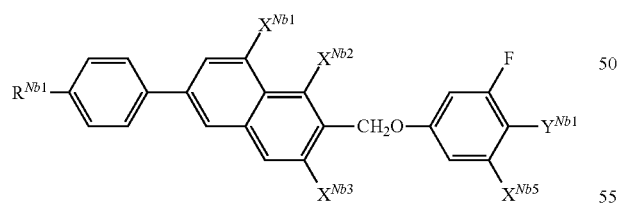

In the formulae, $R^{Nb1}$ represents an alkyl group having 1 to 8 carbon atoms or an alkenyl group having 2 to 8 carbon atoms in which one or non-adjacent two or more —$CH_2$— in the groups may each be independently substituted with —C≡C—, —O—, —CO—, —OCO—, or —OCO—. $R^{Nb1}$ preferably represents an alkyl group having 1 to 5 carbon atoms or an alkenyl group having 2 to 5 carbon atoms.

$X^{Nb1}$ to $X^{Nb5}$ each independently represent a hydrogen atom, a chlorine atom, or a fluorine atom.

$Y^{Nb1}$ represents a fluorine atom, a chlorine atom, a cyano group, a trifluoromethyl group, a fluoromethyl group, a difluoromethoxy group, a trifluoromethoxy group, or a 2,2,2-trifluoroethyl group; preferably, a fluorine atom, a trifluoromethyl group, a fluoromethoxy group, a difluoromethoxy group, or a trifluoromethoxy group; more preferably, a fluorine atom, a trifluoromethyl group, or a trifluoromethoxy group.

The compound represented by the general formula (Pa) is preferably a compound selected from a compound group represented by general formulae (P01) to (P80).

[Chem. 8]

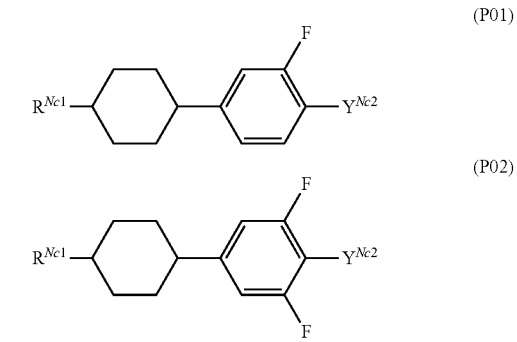
(P01)

(P02)

(P03)

(P04)

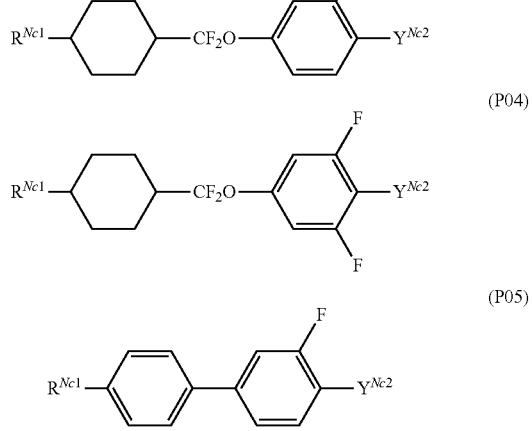
(P05)

(P06)

(P07)

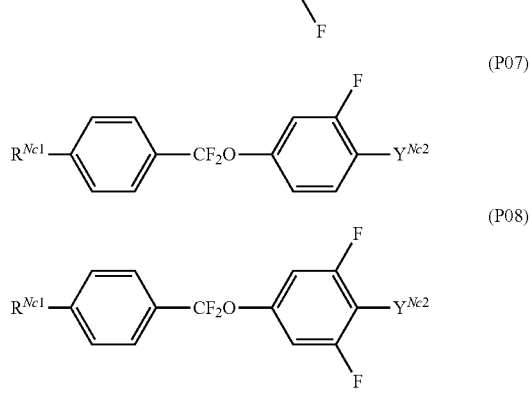
(P08)

(P09) 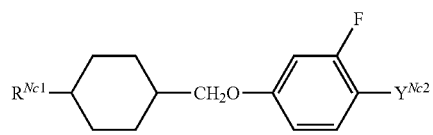
(P10) 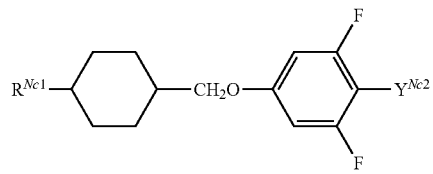
(P11) 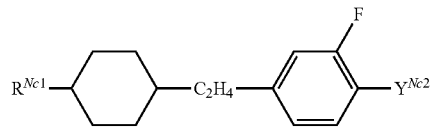
(P12) 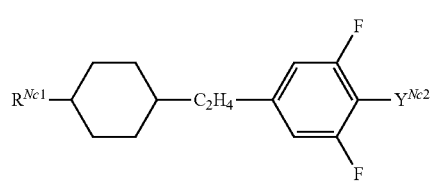
(P13) 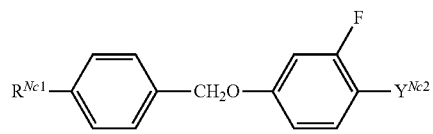
(P14) 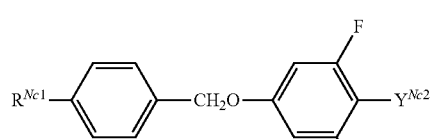
(P15) 
(P16) 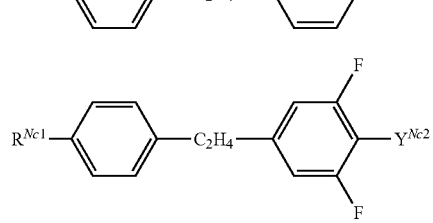
[Chem. 9]
(P17) 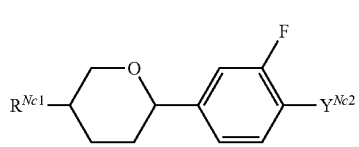
(P18) 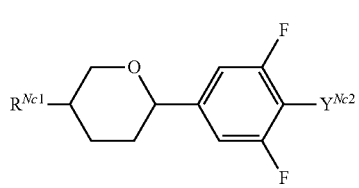
(P19) 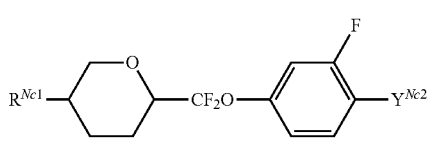
(P20) 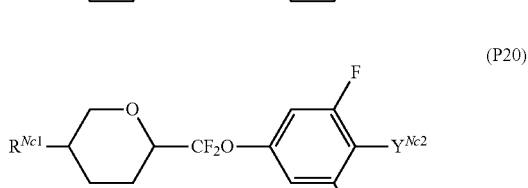
(P21) 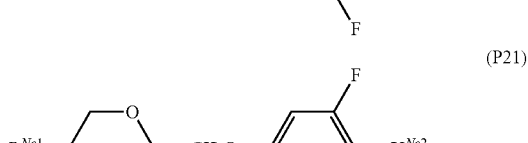
(P22) 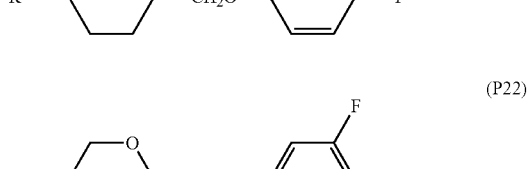
(P23) 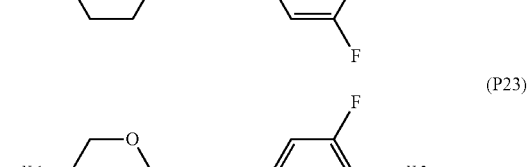
(P24) 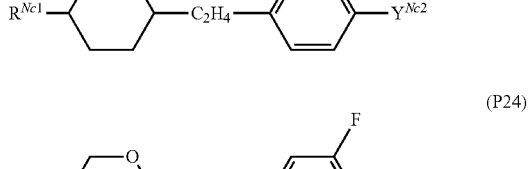
[Chem. 10]
(P25) 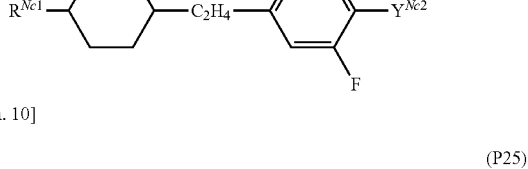
(P26) 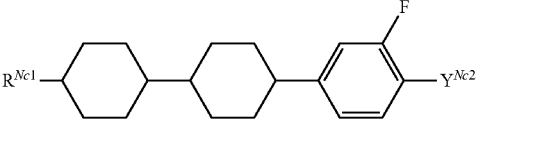
(P27) 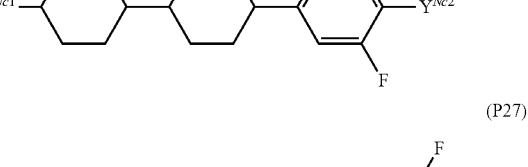

(P28) 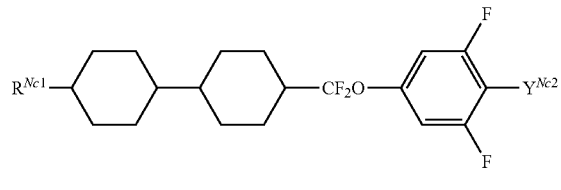
(P29) 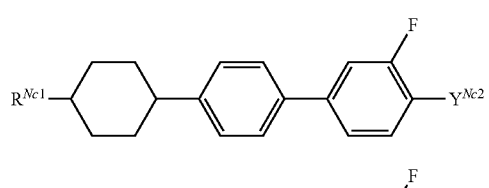
(P30) 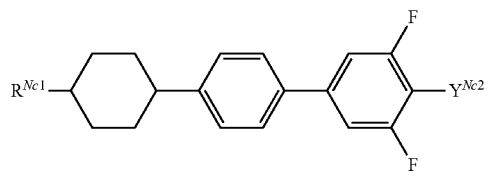
(P31) 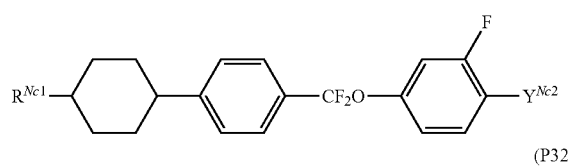
(P32) 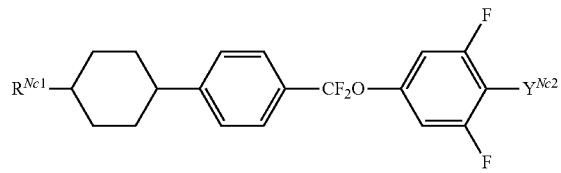
(P33) 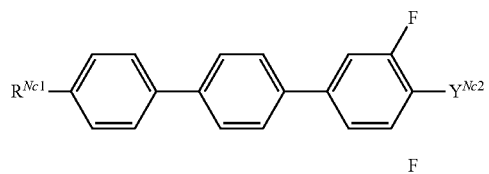
(P34) 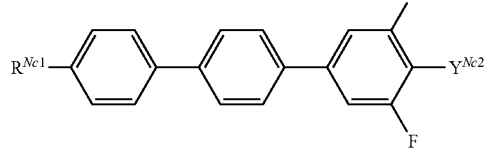
(P35) 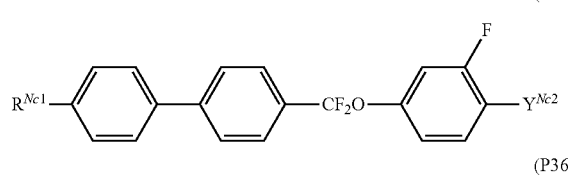
(P36) 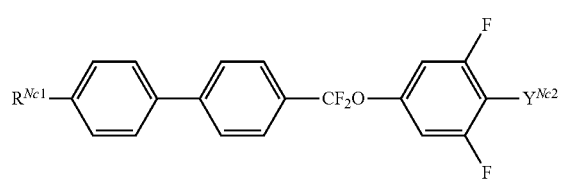
[Chem. 11]
(P37) 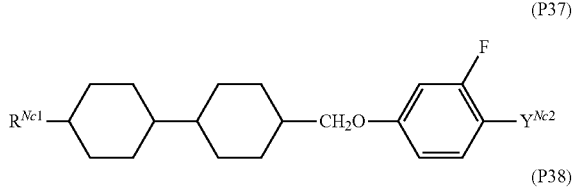
(P38) 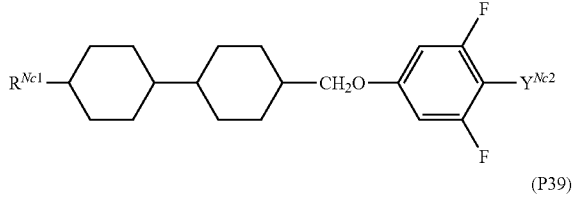
(P39) 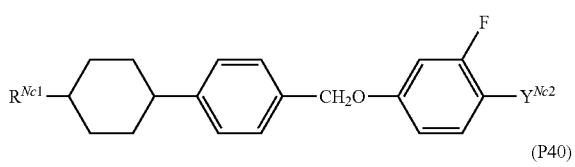
(P40) 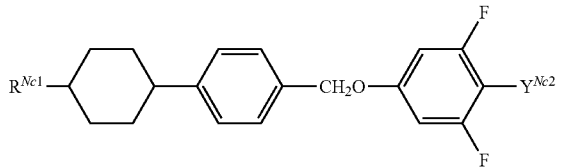
(P41) 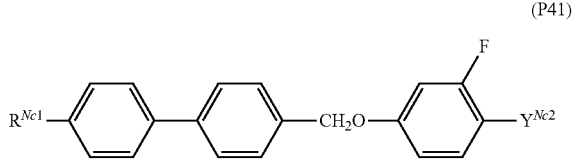
(P42) 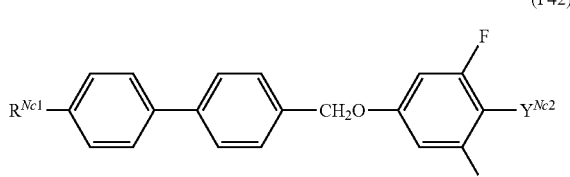
(P43) 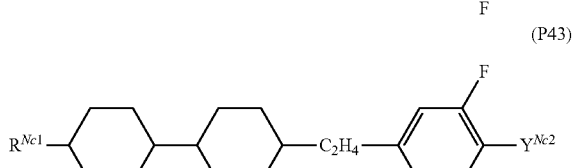
(P44) 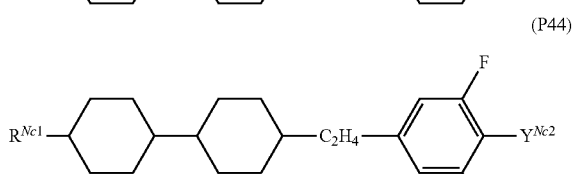
(P45) 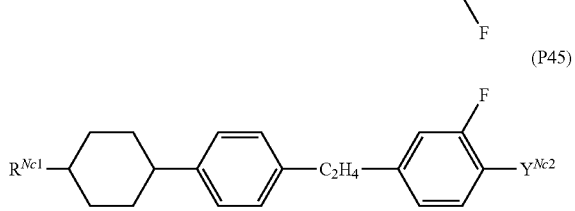

(P46)
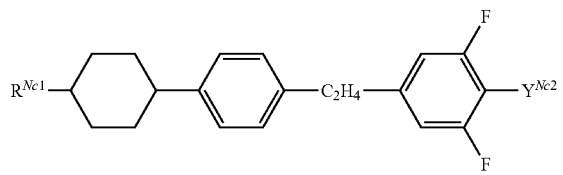
(P47)
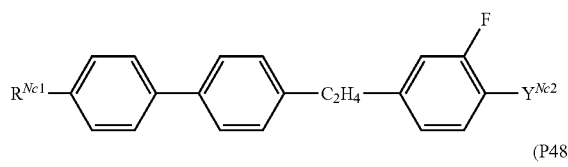
(P48)
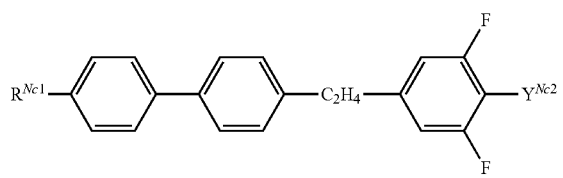
[Chem. 12]
(P49)
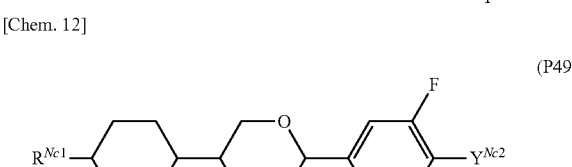
(P50)
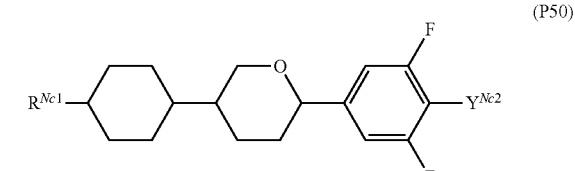
(P51)
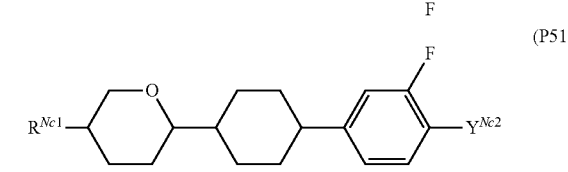
(P52)
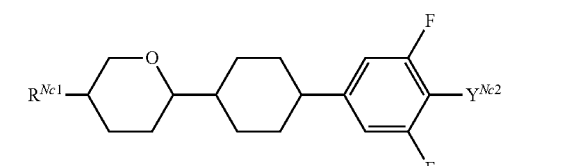
(P53)
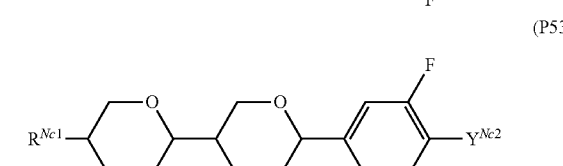
(P54)
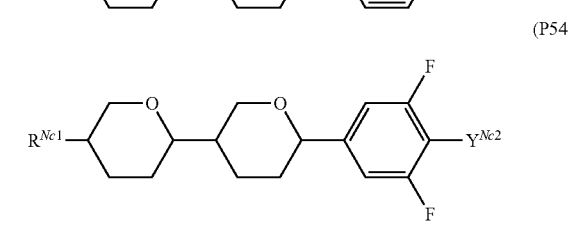
(P55)
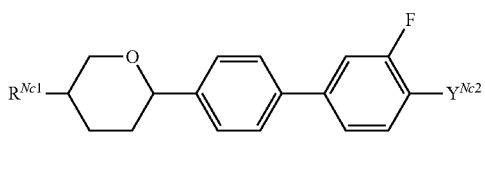
(P56)
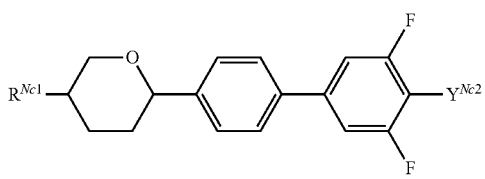
(P57)
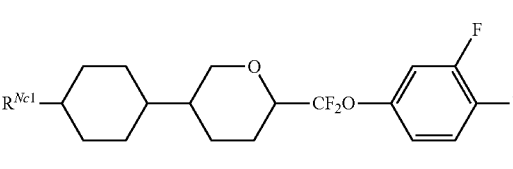
(P58)
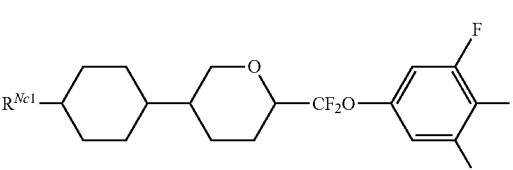
(P59)
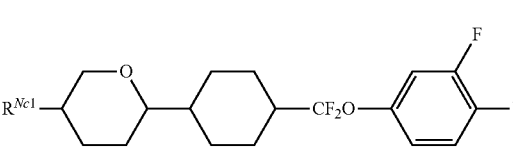
(P60)
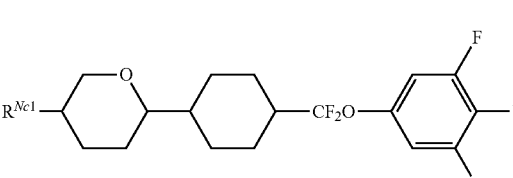
(P61)
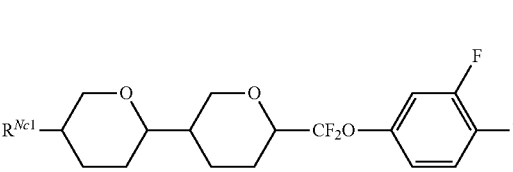
(P62)
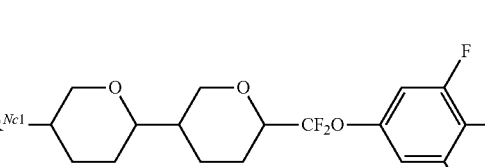
(P63)
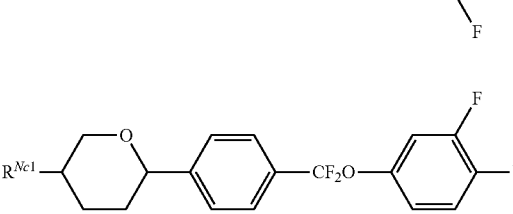

(P64) 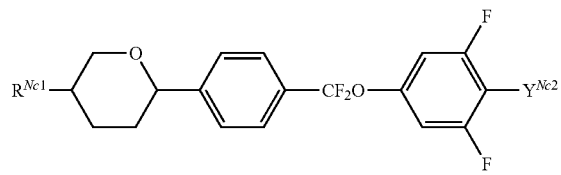
[Chem. 13]
(P65) 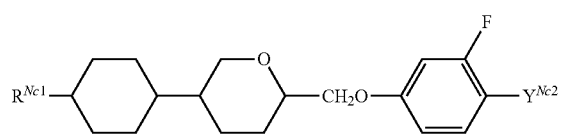
(P66) 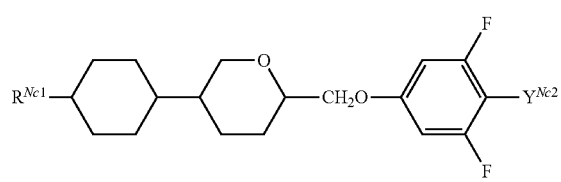
(P67) 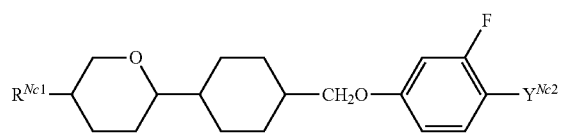
(P68) 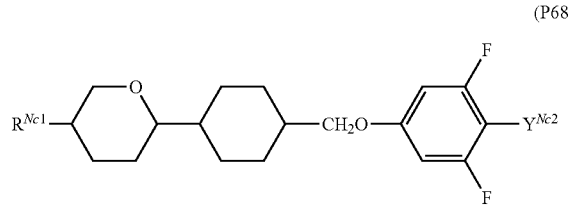
(P69) 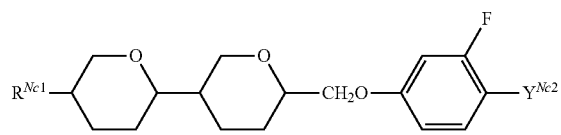
(P70) 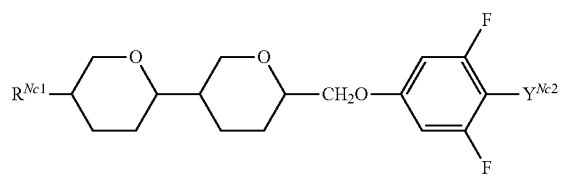
(P71) 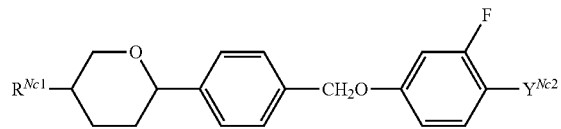
(P72) 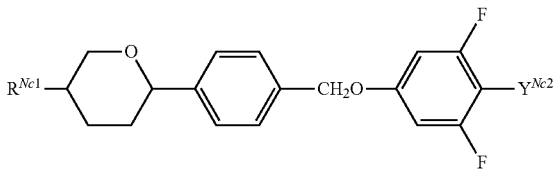
(P73) 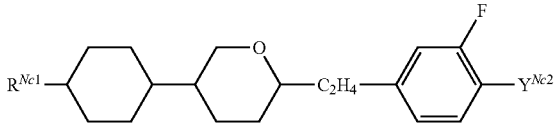
(P74) 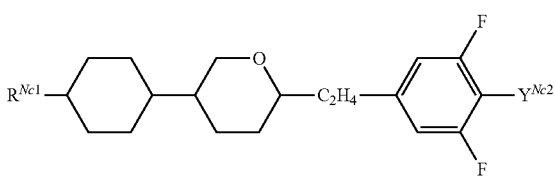
(P75) 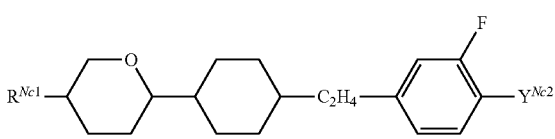
(P76) 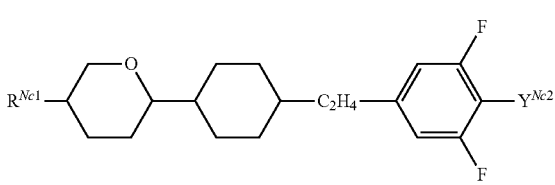
(P77) 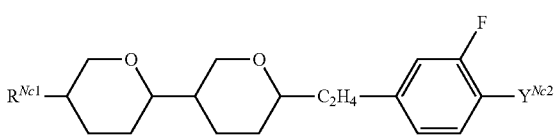
(P78) 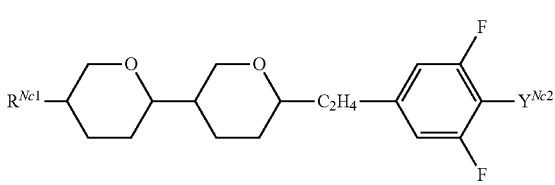
(P79) 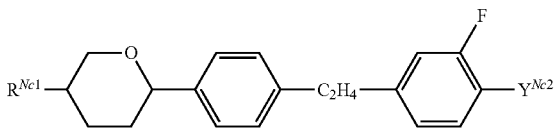

-continued

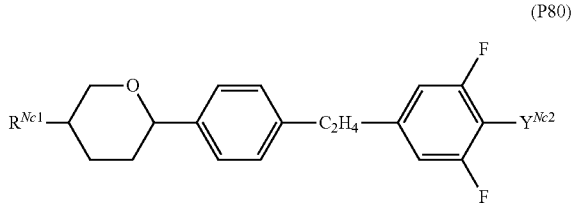
(P80)

In the formulae, $R^{Nc1}$ represents an alkyl group having 1 to 8 carbon atoms or an alkenyl group having 2 to 8 carbon atoms in which one or non-adjacent two or more —$CH_2$— in the groups may each be independently substituted with —C≡C—, —O—, —CO—, —COO—, or —OCO—. $R^{Nc1}$ preferably represents an alkyl group having 1 to 5 carbon atoms or an alkenyl group having 2 to 5 carbon atoms.

$Y^{Nc2}$ represents a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group; preferably, a fluorine atom, a trifluoromethyl group, a fluoromethoxy group, a difluoromethoxy group, or a trifluoromethoxy group; more preferably, a fluorine atom, a trifluoromethyl group, or a trifluoromethoxy group.

A liquid crystal composition according to the present invention may contain, as a third component, a compound having a dielectric anisotropy (Δ∈) that is substantially 0. Specifically, the liquid crystal composition preferably contains at least one compound selected from a compound group represented by a general formula (III-A) to a general formula (III-J).

[Chem. 14]

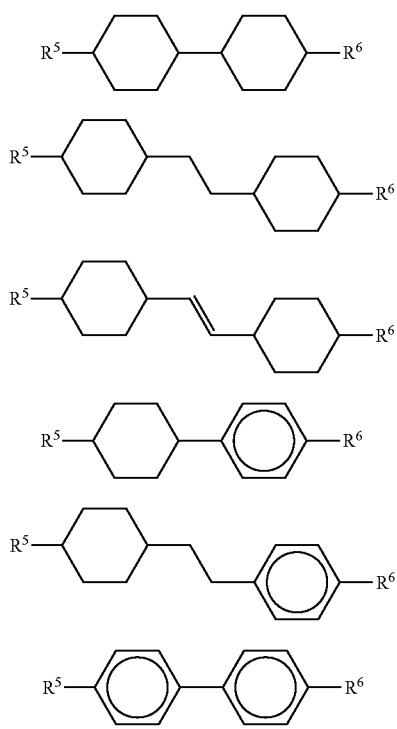

(III-A)
(III-B)
(III-C)
(III-D)
(III-E)
(III-F)

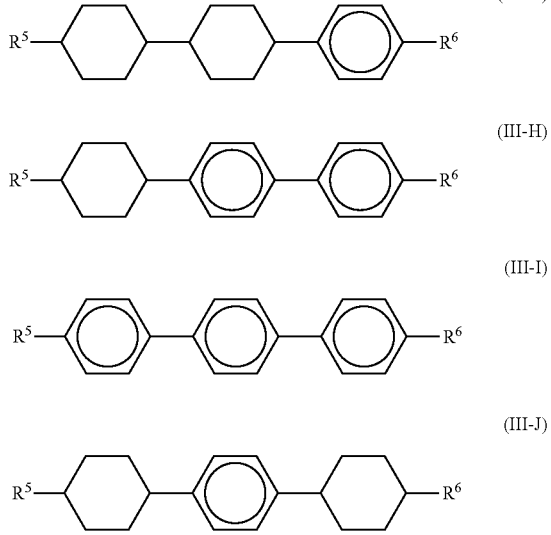

(III-G)
(III-H)
(III-I)
(III-J)

In the formulae, $R^5$ represents an alkyl group having 1 to 5 carbon atoms or an alkenyl group having 2 to 5 carbon atoms; R represents an alkyl group having 1 to 5 carbon atoms, an alkoxyl group having 1 to 5 carbon atoms, an alkenyl group having 2 to 5 carbon atoms, or an alkenyloxy group having 2 to 5 carbon atoms.

The compounds represented by the general formula (III-A) do not include a compound identical to the compound represented by the formula (Ix).

The compound serving as the third component and having a dielectric anisotropy (Δ∈) that is substantially 0 is more preferably selected from compounds represented by the general formula (III-A), the general formula (III-D), the general formula (III-F), the general formula (III-G), and the general formula (III-H).

In the compounds represented by the general formula (III-D), the general formula (III-G), and the general formula (III-H), $R^5$ preferably represents an alkyl group having 1 to 5 carbon atoms or an alkenyl group having 2 to 5 carbon atoms, and $R^6$ preferably represents an alkyl group having 1 to 5 carbon atoms or an alkoxy group having 1 to 5 carbon atoms. In the compounds represented by the general formula (III-F), preferably, $R^5$ and $R^6$ each independently represent an alkyl group having 1 to 5 carbon atoms or an alkenyl group having 2 to 5 carbon atoms.

The content of the compound serving as the third component and having a dielectric anisotropy (Δ∈) that is substantially 0 is preferably 10% to 80% by mass, more preferably 10% to 60% by mass, particularly preferably 20% to 50% by mass.

As an additional component, at least one compound represented by a general formula (VIII-c) or a general formula (VIII-d) may be contained.

[Chem. 15]

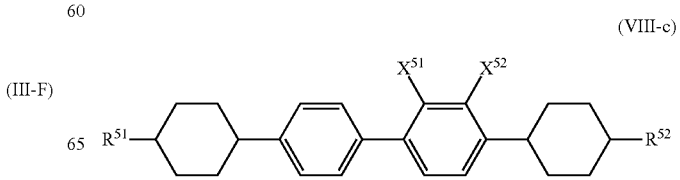
(VIII-c)

[Chem. 16]

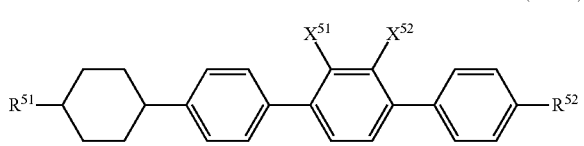

(VIII-d)

In the formulae, $R^{51}$ and $R^{52}$ each independently represent an alkyl group having 1 to 5 carbon atoms, an alkoxyl group having 1 to 5 carbon atoms, an alkenyl group having 2 to 5 carbon atoms, or an alkenyloxy group having 2 to 5 carbon atoms; $X^{51}$ and $X^{52}$ each independently represent a fluorine atom, a chlorine atom, or a hydrogen atom.

A liquid crystal composition according to the present invention may contain a polymerizable compound in order to produce a liquid crystal display element for a PS mode, a horizontal-electric-field PSA mode, a horizontal-electric-field PSVA mode, or the like. Examples of a usable polymerizable compound include photopolymerizable monomers having a liquid crystal skeleton that includes a combination of a plurality of 6-membered rings such as a biphenyl derivative or a terphenyl derivative and undergoes polymerization with an energy ray such as light. Specifically, bifunctional monomers represented by a general formula (XX) are preferred.

[Chem. 17]

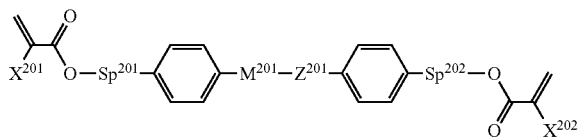

(XX)

In the formula, $X^{201}$ and $X^{202}$ each independently represent a hydrogen atom or a methyl group.

$Sp^{201}$ and $Sp^{202}$ each independently represent a single bond, an alkylene group having 1 to 8 carbon atoms, or —O—$(CH_2)_s$— (where s represents an integer of 2 to 7 and the oxygen atom is bonded to the aromatic ring).

$Z^{201}$ represents —$OCH_2$—, —$CH_2O$—, —COO—, —OCO—, —$CF_2O$—, —$OCF_7$—, —$CH_2CH_2$—, —$CF_2CF_2$—, —CH=CH—COO—, —CH=CH—OCO—, —OCO—CH=CH—, —OCO—CH=CH—, —OCO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, $CY^1=CY^2$— (where $Y^1$ and $Y^2$ each independently represent a fluorine atom or a hydrogen atom), —C≡C—, or a single bond.

$M^{201}$ represents a 1,4-phenylene group, a trans-1,4-cyclohexylene group, or a single bond; and any hydrogen atom in all 1,4-phenylene groups in the formula may be substituted with a fluorine atom).

Preferred are a diacrylate derivative in which $X^{201}$ and $X^{202}$ each represent a hydrogen atom, a dimethacrylate derivative in which $X^{201}$ and $X^{202}$ each represent a methyl group, and a compound in which one of $X^{201}$ and $X^{202}$ represents a hydrogen atom and the other represents a methyl group. For the rates of polymerization of these compounds, the diacrylate derivative has the highest rate, the dimethacrylate derivative has a low rate, and the asymmetric compound has a medium rate between these rates. Depending on the application, a preferred configuration can be employed. In a case where the compound is used for horizontal-electric-field PSA display elements, particularly preferred are dimethacrylate derivatives.

$Sp^{201}$ and $Sp^{202}$ each independently represent a single bond, an alkylene group having 1 to 8 carbon atoms, or —O—$(CH_2)_s$—. In PS mode display elements and horizontal-electric-field PSA mode liquid crystal display elements, at least one of $Sp^{201}$ and $Sp^{202}$ preferably represents a single bond; preferred is a compound in which $Sp^{201}$ and $Sp^{202}$ each represent a single bond or a configuration in which one of $Sp^{201}$ and $Sp^{202}$ represents a single bond and the other one represents an alkylene group having 1 to 8 carbon atoms or —O—$(CH_2)_s$—; in this case, preferred is a 1-4 alkylene group; s preferably represents 1 to 4.

$Z^{201}$ preferably represents —$OCH_2$—, —$CH_2O$—, —COO—, —OCO—, —$CF_2O$—, —$OCF_2$—, —$CH_2CH_2$—, —$CF_2CF_2$—, or single bond; more preferably, —COO—, —OCO—, or a single bond; particularly preferably a single bond.

$M^{201}$ represents a 1,4-phenylene group or a trans-1,4-cyclohexylene group in which any hydrogen atom may be substituted with a fluorine atom, or a single bond; preferably a 1,4-phenylene group or a single bond.

From the standpoint of these respects, the ring structure between $Sp^{201}$ and $Sp^{202}$ in the general formula (XX) is preferably a formula (XXa-1) to a formula (XXa-5), more preferably the formula (XXa-1) to the formula (XXa-3), particularly preferably the formula (XXa-1). Each end of such a formula is bonded to $Sp^{201}$ or $Sp^{202}$.

[Chem. 18]

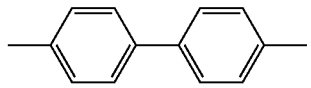

(XXa-1)

[Chem. 19]

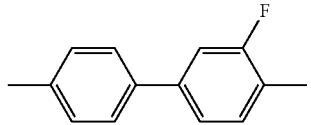

(XXa-2)

[Chem. 20]

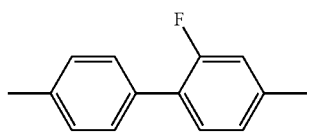

(XXa-3)

[Chem. 21]

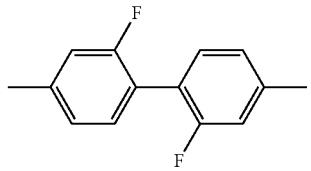

(XXa-4)

-continued

[Chem. 22]

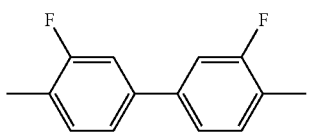
(XXa-5)

Polymerizable compounds having such skeletons are polymerized to provide an anchoring strength optimal for PS mode display elements and horizontal-electric-field PSA mode liquid crystal display elements, so that a good alignment state is achieved. Therefore, unevenness in displaying is advantageously suppressed or completely prevented.

From the standpoint of these respects, as the polymerizable monomer, particularly preferred are compounds represented by the formula (XX-1), the formula (XX-2), the general formula (XX-3), and the general formula (XX-4); of these, the formula (XX-2) is most preferred.

[Chem. 23]

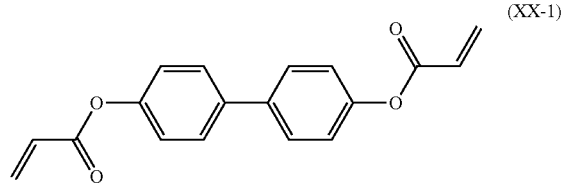
(XX-1)

[Chem. 24]

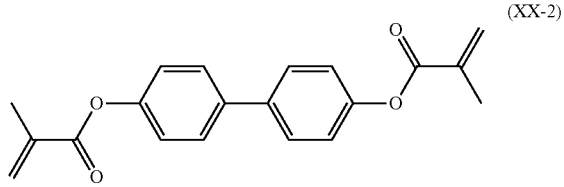
(XX-2)

[Chem. 25]

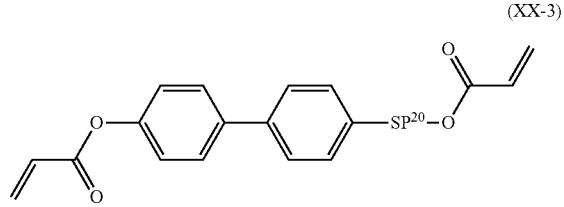
(XX-3)

[Chem. 26]

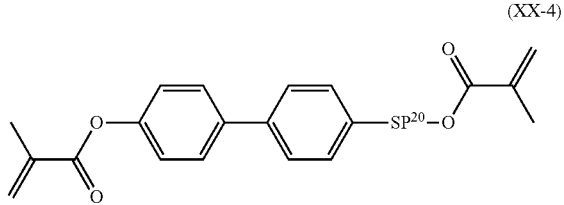
(XX-4)

In the formulae, $Sp^{20}$ represents an alkylene group having 1 to 4 carbon atoms.

In a case where a polymerizable compound is added to a liquid crystal composition according to the present invention, even in the absence of a polymerization initiator, polymerization proceeds; however, in order to promote polymerization, a polymerization initiator may be contained. Examples of the polymerization initiator include benzoin ethers, benzophenones, acetophenones, benzyl ketals, and acylphosphine oxides.

A liquid crystal composition according to the present invention may further contain a compound represented by a general formula (Q).

[Chem.27]

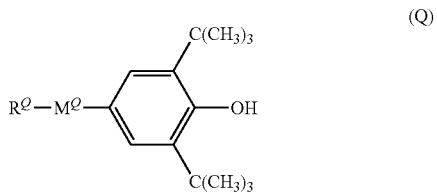
(Q)

In the formula, $R^Q$ represents a linear alkyl group having 1 to 22 carbon atoms or a branched alkyl group having to 22 carbon atoms in which, in the groups, one or non-adjacent two or more $CH_2$ groups may be substituted with —O—, —CH=CH—, —CO—, —OCO—, —COO—, —C≡C—, —$CF_2$O—, or —O$CF_2$—.

$M^Q$ represents a trans-1,4-cyclohexylene group, a 1,4-phenylene group, or a single bond.

Specific preferred compounds represented by the general formula (Q) are compounds represented by a general formula (Q-a) to a general formula (Q-d) below.

[Chem. 28]

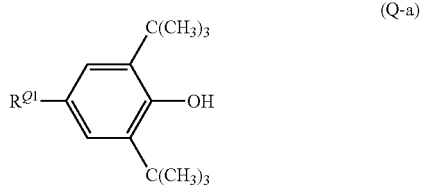
(Q-a)

[Chem. 29]

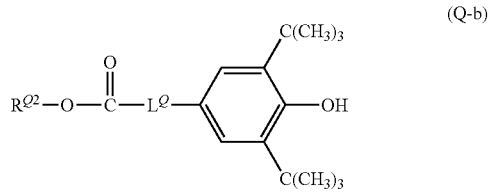
(Q-b)

[Chem. 30]

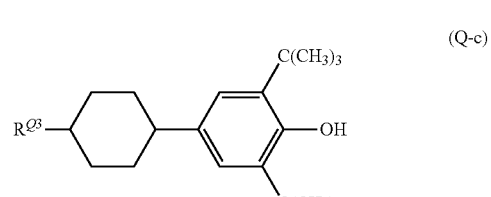
(Q-c)

[Chem. 31]

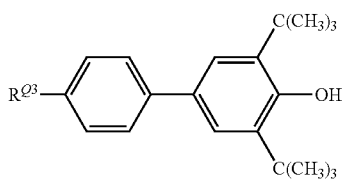

(Q-d)

In the formulae, $R^{Q1}$ preferably represents a linear alkyl group having 1 to 10 carbon atoms or a branched alkyl group having 1 to 10 carbon atoms.

$R^{Q2}$ preferably represents a linear alkyl group having 1 to 20 carbon atoms or a branched alkyl group having 1 to 20 carbon atoms.

$R^{Q3}$ preferably represents a linear alkyl group having 1 to 8 carbon atoms, a branched alkyl group having 1 to 8 carbon atoms, a linear alkoxy group having 1 to 8 carbon atoms, or a branched alkoxy group having 1 to 8 carbon atoms.

$L^Q$ preferably represents a linear alkylene group having 1 to 8 carbon atoms or a branched alkylene group having 1 to 8 carbon atoms.

Of the compounds represented by the general formula (Q-a) to the general formula (Q-d), more preferred are compounds represented by the general formula (Q-c) and the general formula (Q-d).

A liquid crystal composition according to the invention of the present application preferably contains at least one compound represented by the general formula (Q), more preferably one to five compounds; and the content is preferably 0.001% to 1% by mass, more preferably 0.001% to 0.1% by mass, particularly preferably 0.001% to 0.05% by mass.

A liquid crystal composition according to the present invention has a dielectric anisotropy ($\Delta\epsilon$) of 2.0 to 20.0 at 25° C., preferably 4.0 to 18.0, more preferably 4.0 to 16.0, particularly preferably 4.0 to 14.0.

A liquid crystal composition according to the present invention has a refractive index anisotropy ($\Delta n$) of 0.08 to 0.18 at 20° C., more preferably 0.09 to 0.15, particularly preferably 0.09 to 0.12. More specifically, for a small cell gap, it is preferably 0.10 to 0.18; and, for a large cell gap, it is preferably 0.08 to 0.10.

A liquid crystal composition according to the present invention has a viscosity ($\eta$) of 10 to 30 mPa·s at 20° C., preferably 10 to 25 mPa·s, and particularly preferably 10 to 20 mPa·s.

A liquid crystal composition according to the present invention has a rotational viscosity ($\gamma_1$) of 50 to 130 mPa·s at 20° C., preferably 50 to 110 mPa·s, particularly preferably 50 to 90 mPa·s.

A liquid crystal composition according to the present invention has a nematic phase-isotropic liquid phase transition temperature ($T_{ni}$) of 60° C. to 120° C., preferably 70° C. to 110° C., particularly preferably 70° C. to 100° C.

EXAMPLES

Hereinafter, the present invention will be described further in detail with reference to Examples; however, the present invention is not limited to these Examples. The symbol "%" in the compositions of the following Examples and Comparative examples means "% by mass".

In EXAMPLES, the following abbreviations are used to describe compounds.

(Side Chains)

—F —F fluorine atom

F— —F fluorine atom

-n —C—$H_{2n+1}$ linear alkyl group having n carbon atoms n- $C_nH_{2n+1}$— linear alkyl group having n carbon atoms —On —$OC_nH_{2n+1}$ linear alkoxyl group having n carbon atoms nO— $C_nH_{2n+1}$O— linear alkoxyl group having n carbon atoms

—V —CH=$CH_2$

V— $CH_2$=CH—

—V1 —CH=CH—$CH_3$

1V- $CH_3$—CH=CH—

-2V —$CH_2$—$CH_2$—CH=$CH_3$

V2- $CH_3$=CH—$CH_2$—$CH_2$—

-2V1 —$CH_2$—$CH_2$—CH=CH—$CH_3$

1V2- $CH_3$—CH=CH—$CH_2$—$CH_2$ (Ring Structures)

[Chem. 32]

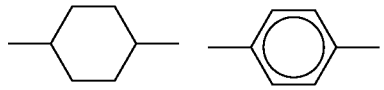

Cy     Ph

Ph1     Ph2

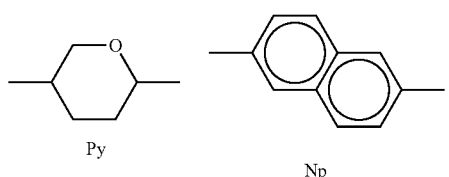

Py     Np

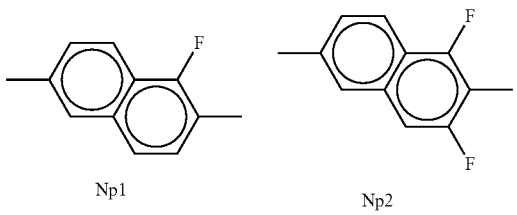

Np1     Np2

-continued

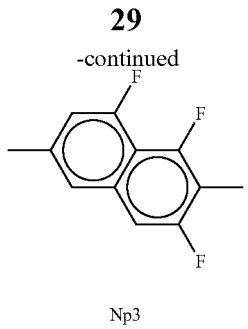

Np3

In EXAMPLES, the following characteristics were measured.

$T_{ni}$: nematic phase-isotropic liquid phase transition temperature (° C.)

$T_{cn}$: crystalline phase-nematic phase transition temperature (° C.)

Δn: refractive index anisotropy at 20° C.

η: viscosity (mPa·s) at 20° C.

$γ_1$: rotational viscosity (mPa·s) at 20° C.

Δ∈: dielectric anisotropy at 25° C.

Comparative Example 1, Example 1, Example 2, and Example 3

Liquid crystal compositions LC-A (Comparative example 1), LC-1 (Example 1), LC-2 (Example 2), and LC-3 (Example 3) were prepared and property values of the compositions were measured. The components of the liquid crystal compositions and the results of the property values are described in Table 1.

Liquid crystal compositions LC-1, LC-2, and LC-3 according to the present invention had lower viscosities (η) and lower rotational viscosities ($γ_1$) than Comparative example LC-A. In addition, Tcn was significantly decreased, which indicates that the solubility at low temperatures had been significantly improved.

Liquid crystal display elements employing these compositions were measured in terms of response speed. As a result, LC-1, LC-2, and LC-3 provided sufficiently high speed responses, each of which was at least 10% higher than that of LC-A. In addition, VHRs were measured and the VHRs were found to be sufficiently high. Incidentally, the cell width was 4 μm and the alignment film was an AL1051. The response speeds were measured under the following conditions: at a Von of 5.5 V, at a Voff of 1.0 V, at a measurement temperature of 20° C., and with a DMS301 from AUTRONIC-MELCHERS GmbH. The VHRs were measured under the following conditions: at 5 V, at 60 Hz, at a measurement temperature of 60° C., with an LCM-2 manufactured by TOYO Corporation.

The resistivities were measured and found to be 1.0E+14 (Ω·cm) or more, which were sufficiently high resistivities. Incidentally, the resistivities were measured with a resistivity meter MMAII-17 from Kawaguchi Electric Works Co., Ltd.

Comparative Example 2, Example 4, and Example 5

Liquid crystal compositions LC-B (Comparative example 2), LC-4 (Example 4), and LC-5 (Example 5) were prepared and property values of the compositions were measured. The components of the liquid crystal compositions and the results of the property values are described in Table 2.

TABLE 1

|  |  | Comparative example 1 LC-A | Example 1 LC-1 | Example 2 LC-2 | Example 3 LC-3 |
|---|---|---|---|---|---|
| 2-Cy-Cy-V1 | Formula (Ix) | — | 10 | 20 | 15 |
| 3-Cy-Cy-2 | General formula (III-A) | 14 | — | — | — |
| 3-Cy-Cy-4 | General formula (III-A) | 4 | — | — | — |
| 3-Cy-Cy-V | General formula (III-A) | — | 10 | 5 | 10 |
| 3-Cy-Cy-V1 | General formula (III-A) | — | 5 | — | — |
| 5-Ph-Ph-1 | General formula (III-F) | 4 | 2 | 2 | — |
| 3-Cy-Cy-Ph-1 | General formula (III-G) | 9 | 4 | 2 | 3 |
| 3-Cy-Ph-Ph-2 | General formula (III-H) | — | — | 2 | 3 |
| 2-Cy-Cy-Ph1-F | General formula (P25) | 14 | 14 | 14 | 14 |
| 3-Cy-Cy-Ph1-F | General formula (P25) | 14 | 14 | 14 | 14 |
| 4-Cy-Cy-Ph1-F | General formula (P25) | 7 | 7 | 7 | — |
| 5-Cy-Cy-Ph1-F | General formula (P25) | 7 | 7 | 7 | 14 |
| 3-Ph1-Np2-F | General formula (Na03) | 4 | 4 | 3 | 5 |
| 2-Cy-Ph1-Np2-F | General formula (Na10) | 2 | 2 | 3 | — |
| 3-Cy-Ph1-Np2-F | General formula (Na10) | 3 | 3 | 3 | 4 |
| 2-Ph-Ph1-Np2-F | General formula (Na12) | 2 | 2 | 2 | — |
| 3-Ph-Ph1-Np2-F | General formula (Na12) | 2 | 2 | 2 | 4 |
| 2-Cy-Cy-Ph-Ph1-F | General formula (Pa) | 3 | 3 | 3 | 4 |
| 3-Cy-Cy-Ph-Ph1-F | General formula (Pa) | 3 | 3 | 3 | 4 |
| 4-Cy-Ph-Ph-Ph1-F | General formula (Pa) | 2 | 2 | 2 | — |
| 2-Ph2-O1-Cy-Ph2-Ph2-F | General formula (Pa) | 3 | 3 | 3 | 3 |
| 3-Ph2-O1-Cy-Ph2-Ph2-F | General formula (Pa) | 3 | 3 | 3 | 3 |
| Total |  | 100 | 100 | 100 | 100 |
| Tni [° C.] |  | 101 | 102 | 101 | 102 |
| Tcn [° C.] |  | −25 | −58 | −55 | −53 |
| Δn |  | 0.103 | 0.104 | 0.105 | 0.104 |
| η [mPa · s] |  | 25.1 | 20.8 | 21.5 | 21.6 |
| γ1 [mPa · s] |  | 133 | 115 | 119 | 120 |
| Δε |  | 6.6 | 6.7 | 6.6 | 6.6 |

TABLE 2

| | | Comparative example 2 LC-B | Example 4 LC-4 | Example 5 LC-5 |
|---|---|---|---|---|
| 2-Cy-Cy-V1 | Formula (Ix) | — | 15 | 10 |
| 3-Cy-Cy-2 | General formula (III-A) | 15 | 3 | 3 |
| 3-Cy-Cy-V | General formula (III-A) | 5 | 5 | 5 |
| 3-Cy-Cy-V1 | General formula (III-A) | — | — | 5 |
| 5-Ph-Ph-1 | General formula (III-F) | 4 | 2 | 2 |
| 3-Cy-Cy-Ph-1 | General formula (III-G) | 4 | 3 | 1.5 |
| 3-Cy-Ph-Ph-2 | General formula (III-H) | — | — | 1.5 |
| 2-Cy-Cy-Ph1-F | General formula (P25) | 15 | 15 | 15 |
| 3-Cy-Cy-Ph1-F | General formula (P25) | 13 | 15 | 15 |
| 4-Cy-Cy-Ph1-F | General formula (P25) | — | — | 6 |
| 5-Cy-Cy-Ph1-F | General formula (P25) | 12 | 12 | 6 |
| 3-Ph1-Np2-F | General formula (Na03) | 3 | 3 | 4 |
| 2-Cy-Ph1-Np2-F | General formula (Na10) | | | 3 |
| 3-Cy-Ph1-Np2-F | General formula (Na10) | 7 | 7 | 3 |
| 2-Ph-Ph1-Np2-F | General formula (Na12) | | | 2 |
| 3-Ph-Ph1-Np2-F | General formula (Na12) | 4 | 4 | 2 |
| 2-Cy-Cy-Ph-Ph1-F | General formula (Pa) | 4 | 3 | 3 |
| 3-Cy-Cy-Ph-Ph1-F | General formula (Pa) | 4 | 3 | 3 |
| 2-Ph-O1-Ph2-Np2-F | General formula (Pa) | 2 | 2 | 2 |
| 3-Ph-O1-Ph2-Np2-F | General formula (Pa) | 2 | 2 | 2 |
| 2-Ph2-O1-Cy-Ph2-Ph2-F | General formula (Pa) | 3 | 3 | 3 |
| 3-Ph2-O1-Cy-Ph2-Ph2-F | General formula (Pa) | 3 | 3 | 3 |
| Total | | 100 | 100 | 100 |
| Tni [° C.] | | 97 | 98 | 97 |
| Tcn [° C.] | | −36 | −40 | −42 |
| Δn | | 0.109 | 0.109 | 0.109 |
| η [mPa · s] | | 23.9 | 22.2 | 21.9 |
| γ1 [mPa · s] | | 122 | 109 | 106 |
| Δε | | 8.2 | 8.2 | 8.2 |

Liquid crystal compositions LC-4 and LC-5 according to the present invention had lower viscosities ($\eta_1$) and lower rotational viscosities ($\gamma_1$) than Comparative example LC-B. In addition, Tcn was decreased, which indicates that the solubility at low temperatures had been improved.

Liquid crystal display elements employing these compositions were measured in terms of response speed. As a result, LC-4 and LC-5 provided sufficiently high speed responses, each of which was at least 10% higher than that of LC-B. In addition, VHRs were measured and the VHRs were found to be sufficiently high. Incidentally, the cell width was 4 μm and the alignment film was an AL1051. The response speeds were measured under the following conditions: at a Von of 5.5 V, at a Voff of 1.0 V, at a measurement temperature of 20° C., and with a DMS301 from AUTRONIC-MELCHERS GmbH. The VHRs were measured under the following conditions: at 5 V, at 60 Hz, at a measurement temperature of 60° C., with an LCM-2 manufactured by TOYO Corporation.

The resistivities were measured and found to be 1.0E+14 (Ω·cm) or more, which were sufficiently high resistivities. Incidentally, the resistivities were measured with a resistivity meter MMAII-17 from Kawaguchi Electric Works Co., Ltd.

Comparative Example 3, Example 6, and Example 7

Liquid crystal compositions LC-C (Comparative example 3), LC-6 (Example 6), and LC-7 (Example 7) were prepared and property values of the compositions were measured. The components of the liquid crystal compositions and the results of the property values are described in Table 3.

TABLE 3

| | | Comparative example 3 LC-C | Example 6 LC-6 | Example 7 LC-7 |
|---|---|---|---|---|
| 2-Cy-Cy-V1 | Formula (Ix) | | 18 | 15 |
| 3-Cy-Cy-2 | Formula (III-A) | 15 | — | — |
| 3-Cy-Cy-V | Formula (III-A) | 5 | 5 | 8 |
| 3-Cy-Cy-V1 | Formula (III-A) | 12 | 12 | 12 |
| 3-Cy-Cy-Ph-1 | Formula (III-G) | | | 3 |
| V-Cy-Cy-Ph-1 | Formula (III-G) | 16 | 13 | 8 |
| V2-Cy-Cy-Ph-1 | Formula (III-G) | 8 | 8 | 8 |
| 3-Cy-Ph-Ph-2 | Formula (III-H) | | | 2 |
| 3-Ph-Ph2-CF$_2$O-Ph2-F | Formula (Pa) | 12 | 12 | 12 |
| 3-Ph-Ph1-Ph2-CF$_2$O-Ph2-F | Formula (Pa) | 5 | 5 | 5 |
| 2-Py-Ph2-CF$_2$O-Ph2-F | Formula (Pa) | 3 | 3 | 3 |
| 3-Py-Ph2-CF$_2$O-Ph2-F | Formula (Pa) | 5 | 5 | 5 |
| 3-Cy-Ph-Ph1-F | Formula (P29) | 5 | 5 | 5 |

TABLE 3-continued

|  |  | Comparative example 3 LC-C | Example 6 LC-6 | Example 7 LC-7 |
|---|---|---|---|---|
| 3-Cy-Cy-CF$_2$O-Ph2-F | Formula (P28) | 10 | 10 | 10 |
| 5-Cy-Cy-CF$_2$O-Ph2-F | Formula (P28) | 4 | 4 | 4 |
| Total |  | 100 | 100 | 100 |
| Tni [° C.] |  | 85 | 86 | 87 |
| Tcn [° C.] |  | −29 | −38 | −44 |
| Δn |  | 0.102 | 0.103 | 0.104 |
| η [mPa · s] |  | 16.6 | 15.9 | 15.7 |
| γ1 [mPa · s] |  | 101 | 89 | 88 |
| Δε |  | 9.0 | 9.0 | 9.0 |

Liquid crystal compositions LC-6 and LC-7 according to the present invention had lower viscosities (η) and lower rotational viscosities (γ$_1$) than Comparative example LC-C. In addition, Tcn was significantly decreased, which indicates that the solubility at low temperatures had been significantly improved.

Liquid crystal display elements employing these compositions were measured in terms of response speed. As a result, LC-6 and LC-7 provided sufficiently high speed responses, each of which was at least 10% higher than that of LC-C. In addition, VHRs were measured and the VHRs were found to be sufficiently high. Incidentally, the cell width was 4 μm and the alignment film was an AL1051. The response speeds were measured under the following conditions: at a Von of 5.5 V, at a Voff of 1.0 V, at a measurement temperature of 20° C., and with a DMS301 from AUTRONIC-MELCHERS GmbH. The VHRs were measured under the following conditions: at 5 V, at 60 Hz, at a measurement temperature of 60° C., with an LCM-2 manufactured by TOYO Corporation.

The resistivities were measured and found to be 1.0E+14 (Ω·cm) or more, which were sufficiently high resistivities. Incidentally, the resistivities were measured with a resistivity meter MMAII-17 from Kawaguchi Electric Works Co., Ltd.

Comparative Example 4, Example 8, Example 9, and Example 10

Liquid crystal compositions LC-D (Comparative example 4), LC-8 (Example 8), LC-9 (Example 9), and LC-10 (Example 10) were prepared and property values of the compositions were measured. The components of the liquid crystal compositions and the results of the property values are described in Table 4.

TABLE 4

|  |  | Comparative example 4 LC-D | Example 8 LC-8 | Example 9 LC-9 | Example 10 LC-10 |
|---|---|---|---|---|---|
| 2-Cy-Cy-V1 | Formula (Ix) | — | 25 | 35 | 26 |
| 3-Cy-Cy-2 | General formula (III-A) | 25 | 10 | — | 3 |
| 3-Cy-Cy-4 | General formula (III-A) | 10 | — | — | — |
| 3-Cy-Cy-V | General formula (III-A) | — | — | — | 3 |
| 3-Cy-Cy-V1 | General formula (III-A) | — | — | — | 3 |
| 5-Ph-Ph-1 | General formula (III-F) | 4 | 4 | 4 | 4 |
| 3-Cy-Cy-Ph-1 | General formula (III-G) | 2 | 2 | 2 | 2 |
| 3-Cy-Ph-Ph-2 | General formula (III-H) | 2 | 2 | 2 | 2 |
| 2-Cy-Cy-Ph1-F | General formula (P25) | 10 | 10 | 10 | 10 |
| 3-Cy-Cy-Ph1-F | General formula (P25) | 10 | 10 | 10 | 10 |
| 4-Cy-Cy-Ph1-F | General formula (P25) | 10 | 10 | 10 | 10 |
| 3-Ph1-Np2-F | General formula (Na03) | 4 | 4 | 4 | 4 |
| 3-Cy-Ph1-Np2-F | General formula (Na10) | 5 | 5 | 5 | 5 |
| 3-Ph-Ph1-Np2-F | General formula (Na12) | 4 | 4 | 4 | 4 |
| 3-Cy-Cy-Ph-Ph1-F | General formula (Pa) | 4 | 4 | 4 | 4 |
| 4-Cy-Ph-Ph-Ph1-F | General formula (Pa) | 4 | 4 | 4 | 4 |
| 2-Ph2-O1-Cy-Ph2-Ph2-F | General formula (Pa) | 3 | 3 | 3 | 3 |
| 3-Ph2-O1-Cy-Ph2-Ph2-F | General formula (Pa) | 3 | 3 | 3 | 3 |
| Total |  | 100 | 100 | 100 | 100 |
| Tni [° C.] |  | 89 | 90 | 91 | 93 |
| Tcn [° C.] |  | −13 | −42 | −45 | −48 |
| Δn |  | 0.095 | 0.096 | 0.096 | 0.097 |
| η [mPa · s] |  | 18.6 | 16.6 | 16.7 | 16.5 |
| Δε |  | 5.0 | 5.0 | 5.0 | 5.0 |

Liquid crystal compositions LC-8, LC-9, and LC-10 according to the present invention had lower viscosities (η) and significantly lower Tcn than Comparative example LC-D.

Liquid crystal display elements employing these compositions were measured in terms of response speed. As a result, LC-8, LC-9, and LC-10 provided sufficiently high speed responses, each of which was at least 10% higher than that of LC-D. In addition, VHRs were measured and the VHRs were found to be sufficiently high. Incidentally, the cell width was 4 µm and the alignment film was an AL1051. The response speeds were measured under the following conditions: at a Von of 5.5 V, at a Voff of 1.0 V, at a measurement temperature of 20° C., and with a DMS301 from AUTRONIC-MELCHERS GmbH. The VHRs were measured under the following conditions: at 5 V, at 60 Hz, at a measurement temperature of 60° C., with an LCM-2 manufactured by TOYO Corporation.

The resistivities were measured and found to be 1.0E+14 (Ω·cm) or more, which were sufficiently high resistivities. Incidentally, the resistivities were measured with a resistivity meter MMAII-17 from Kawaguchi Electric Works Co., Ltd.

As described above, liquid crystal compositions according to the present invention have, without a decrease in refractive index anisotropy (Δn) or nematic phase-isotropic liquid phase transition temperature ($T_{ni}$), a sufficiently low viscosity (η), a sufficiently low rotational viscosity ($γ_1$), and a negative dielectric anisotropy (Δ∈) that has a large absolute value. Accordingly, for example, P-type TFT or IPS liquid crystal display elements employing the composition have been demonstrated that the displaying quality is high with prevention or suppression of displaying failure and the response speed is high.

The invention claimed is:

1. A liquid crystal composition comprising, as a first component, a compound represented by a formula (Ix)

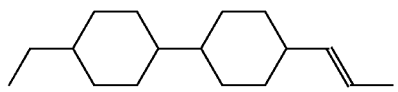

(Ix)

in a content of 3% to 60% by mass; and, as a second component that is a component (A) having a positive dielectric anisotropy (□□), at least one compound represented by a general formula (Pa)

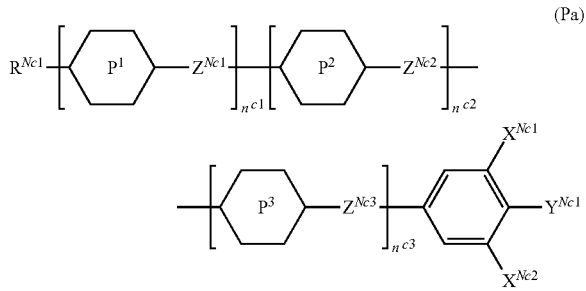

(Pa)

(where $R^{Nc1}$ represents an alkyl group having 1 to 8 carbon atoms or an alkenyl group having 2 to 8 carbon atoms in which one or non-adjacent two or more —CH$_2$— in the groups may each be independently substituted with —C≡C—, —O—, —CO—, —COO—, or —OCO—; rings P$^1$, P$^2$, and P$^3$ each independently represent a 1,4-cyclohexylene group (one or non-adjacent two or more —CH$_2$— in the group may be substituted with —O— or —S—) or a 1,4-phenylene group (one or non-adjacent two or more —CH= in the group may be substituted with —N=); hydrogen atoms in the rings P$^1$, P$^2$, and P$^3$ may each be independently substituted with a cyano group, a fluorine atom, or a chlorine atom; $Z^{Nc1}$, $Z^{Nc2}$, and $Z^{Nc3}$ each independently represent a single bond, —CH$_2$CH$_2$—, —(CH$_2$)$_4$—, —OCH$_2$—, —CH$_2$O—, —OCF$_2$—, —CF$_2$O—, —COO—, —OCO—, or —C≡C—; $n^{c1}$, $n^{c2}$, and $n^{c3}$ each independently represent 0, 1, or 2 and $n^{c1}+n^{c2}+n^{c3}$ represents 1, 2, 3, 4, or 5; in a case where $n^{c1}$, $n^{c2}$, and/or $n^{c3}$ represents 2 and a plurality of rings P$^1$, P$^2$, P$^3$, $Z^{Nc1}$, $Z^{Nc2}$, and/or $Z^{Nc3}$ are present, these may be the same or different; $X^{Nc1}$ and $X^{Nc2}$ each independently represent a hydrogen atom, a chlorine atom, or a fluorine atom; and $Y^{Nc1}$ represents a fluorine atom, a chlorine atom, a cyano group, a trifluoromethyl group, a fluoromethoxy group, a difluoromethoxy group, a trifluoromethoxy group, or a 2,2,2-trifluoroethyl group), wherein, in the at least one compound represented by the general formula (Pa), $Z^{Nc1}$, $Z^{Nc2}$, and $Z^{Nc3}$ represent a single bond and $n^{c1}$, $n^{c2}$, and $n^{c3}$ represent 1.

2. The liquid crystal composition according to claim 1, wherein a content of the component (A) is 10% to 90% by mass.

3. The liquid crystal composition according to claim 1, wherein a dielectric anisotropy (Δ∈) at 25° C. is in a range of 2.0 to 20.0, a refractive index anisotropy (Δn) at 20° C. is in a range of 0.08 to 0.18, a viscosity (η) at 20° C. is in a range of 10 to 30 mPa·s, a rotational viscosity (γ1) at 20° C. is in a range of 50 to 130 mPa·s, and a nematic phase-isotropic liquid phase transition temperature ($T_{ni}$) is in a range of 60° C. to 120° C.

4. The liquid crystal composition according to claim 1, further comprising, as the component (A), at least one compound selected from compounds represented by a general formula (Na) and a general formula (Nb)

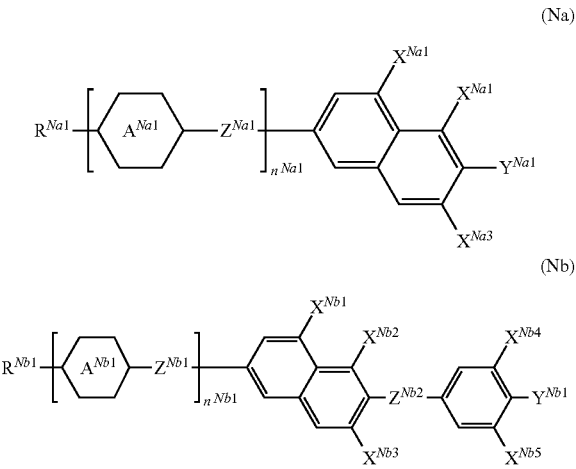

(Na)

(Nb)

(where $R^{Na1}$ and $R^{Nb1}$ each independently represent an alkyl group having 1 to 8 carbon atoms or an alkenyl group having 2 to 8 carbon atoms in which one or non-adjacent two or more —CH$_2$— in the groups may each be independently substituted with —C≡C—, —O—, —CO—, —COO—, or —OCO—; rings $A^{Na1}$ and $A^{Nb1}$ each independently represent a 1,4-cyclohexylene group (one or non-adjacent two or more —CH$_2$— in the group may be substituted with —O— or —S—) or a 1,4-phenylene group (one or non-adjacent two or more —CH= in the group may be substituted with —N=); hydrogen atoms in the rings $A^{Na1}$ and $A^{Nb1}$ may each be independently substituted with a cyano group, a fluorine atom, or a chlorine atom; $Z^{Na1}$, $Z^{Nb1}$, and $Z^{Nb2}$ each independently represent a single bond, —CH$_2$CH$_2$—, —(CH$_2$)$_4$—, —OCH$_2$—, —CH$_2$O—, —OCF$_2$—, —CF$_2$O—, —COO—, —OCO—, or —C≡C—; $n^{Na1}$ represents 1, 2, 3, or 4 and, in a case where $n^{Na1}$ represents 2, 3, or 4 and a plurality of rings $A^{Na1}$ are present, these may be the same or different; similarly, in a case where a plurality of $Z^{Na1}$ are present, these may be the same or different; $n^{Nb1}$ represents 0, 1, 2, or 3 and in a case where $n^{Nb1}$ represents 2, 3, or 4 and a plurality of rings $A^{Nb1}$ are present, these may be the same or different; similarly, in a case where a plurality of $Z^{Nb1}$ are present, these may be the same or different; $X^{Na1}$, $X^{Na2}$, $X^{Na3}$, $X^{Nb1}$, $X^{Nb2}$, $X^{Nb3}$, $X^{Nb4}$, and $X^{Nb5}$ each independently represent a hydrogen atom, a chlorine atom, or a fluorine atom; and $Y^{Na1}$ and $Y^{Nb1}$ each independently represent a fluorine atom, a chlorine atom, a cyano group, a trifluoromethyl group, a fluoromethoxy group, a difluoromethoxy group, a trifluoromethoxy group, or a 2,2,2-trifluoroethyl group).

5. The liquid crystal composition according to claim 4, comprising at least one compound selected from compounds represented by, as the general formula (Na), a general formula (Na01) to a general formula (Na12)

(Na01)

(Na02)

(Na03)

-continued

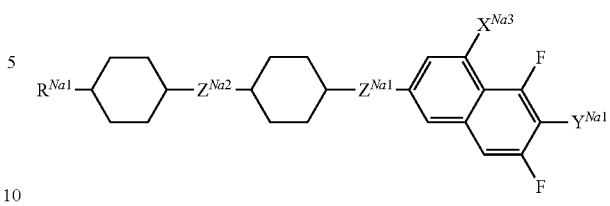
(Na04)

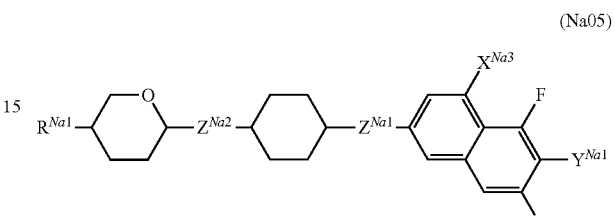
(Na05)

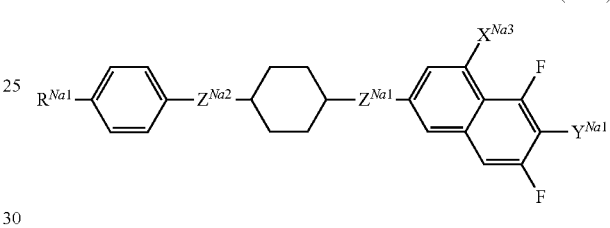
(Na06)

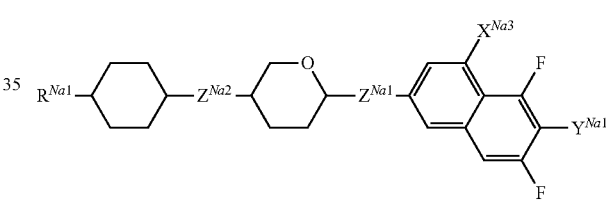
(Na07)

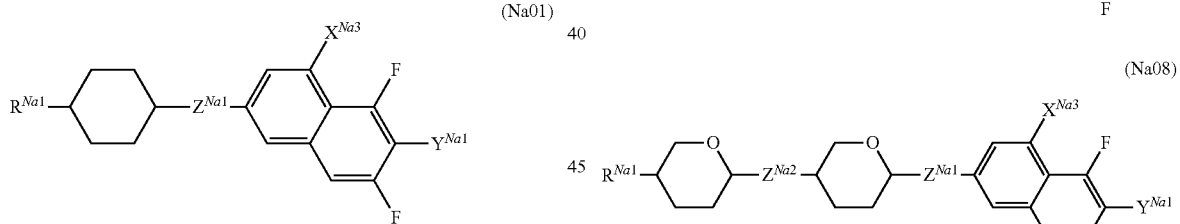
(Na08)

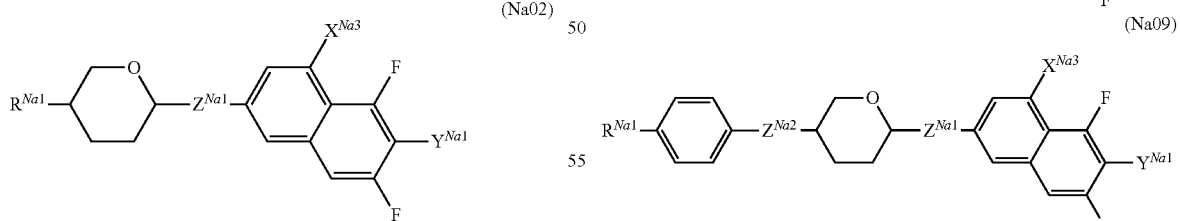
(Na09)

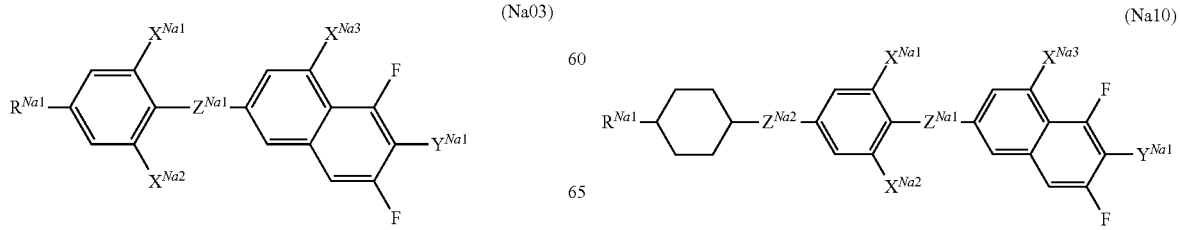
(Na10)

(Na11)

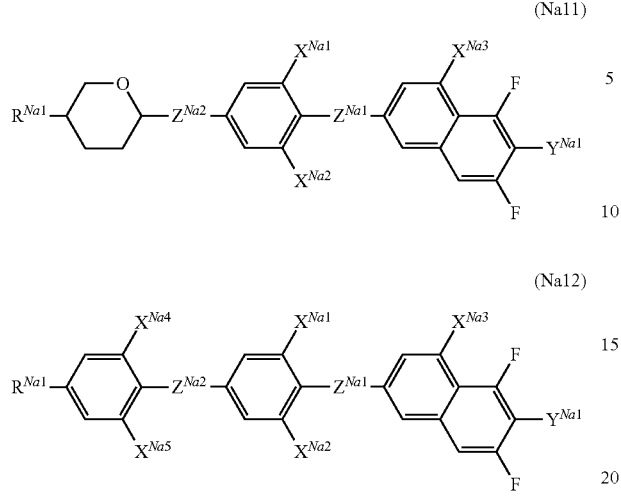

(Na12)

(where $R^{Na1}$ represents an alkyl group having 1 to 8 carbon atoms or an alkenyl group having 2 to 8 carbon atoms in which one or non-adjacent two or more —CH$_2$— in the groups may each be independently substituted with —C≡C—, —O—, —CO—, —COO—, or —OCO—; $Z^{Na1}$ and $Z^{Na2}$ each independently represent a single bond, —CH$_2$CH$_2$—, —(CH$_2$)$_4$—, —OCH$_2$—, —CH$_2$O—, —OCF$_2$—, —CF$_2$O—, —COO—, —OCO—, or —C≡C—; $X^{Na1}$ to $X^{Na5}$ each independently represent a hydrogen atom, a chlorine atom, or a fluorine atom; and $Y^{Na1}$ represents a fluorine atom, a chlorine atom, a cyano group, a trifluoromethyl group, a fluoromethoxy group, a difluoromethoxy group, a trifluoromethoxy group, or a 2,2,2-trifluoroethyl group).

6. The liquid crystal composition according to claim 4, comprising at least one compound selected from compounds represented by, as the general formula (Nb), a general formula (Nb01) to a general formula (Nb16)

(Nb01)

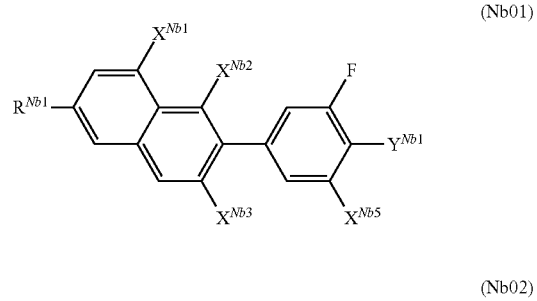

(Nb02)

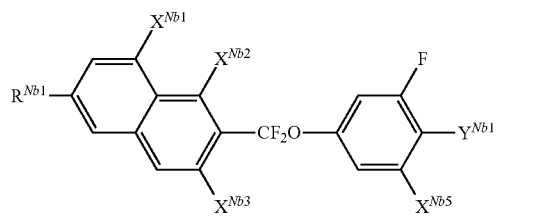

(Nb03)

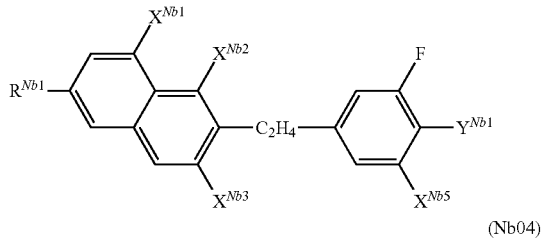

(Nb04)

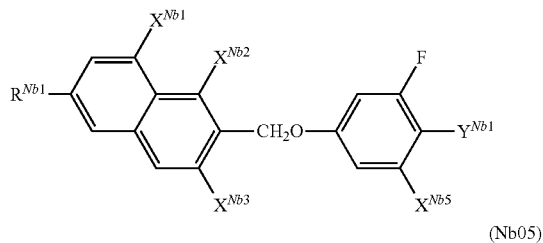

(Nb05)

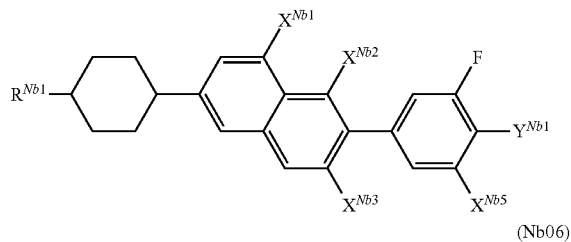

(Nb06)

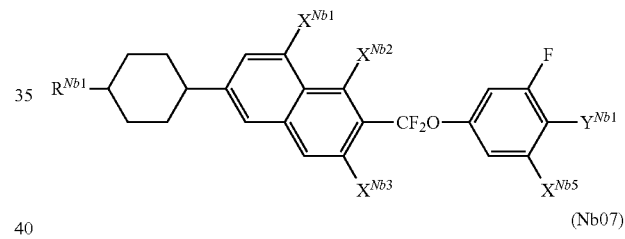

(Nb07)

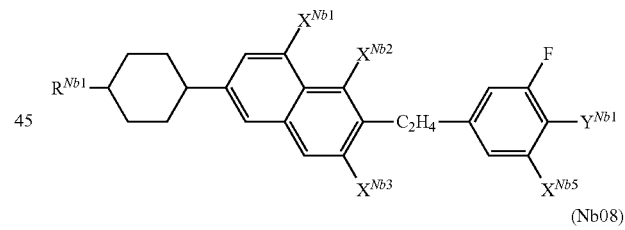

(Nb08)

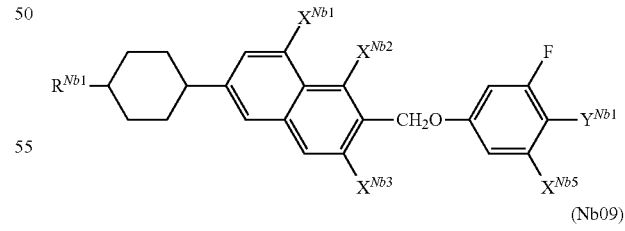

(Nb09)

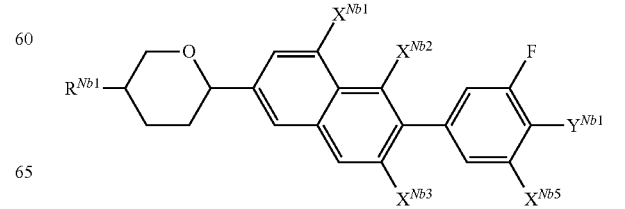

-continued

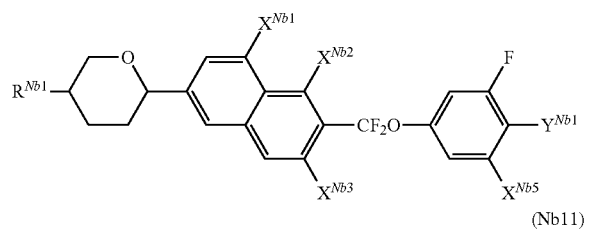
(Nb10)

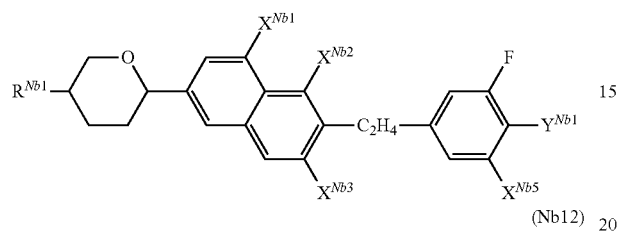
(Nb11)

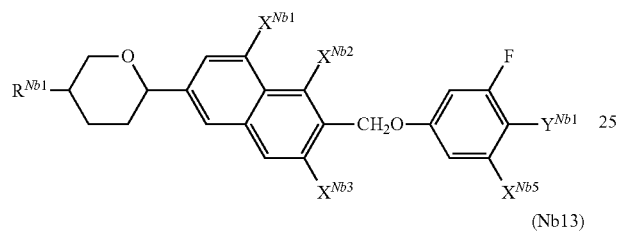
(Nb12)

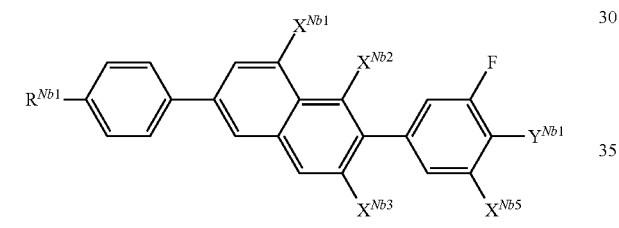
(Nb13)

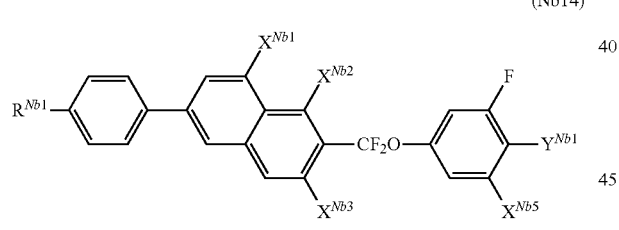
(Nb14)

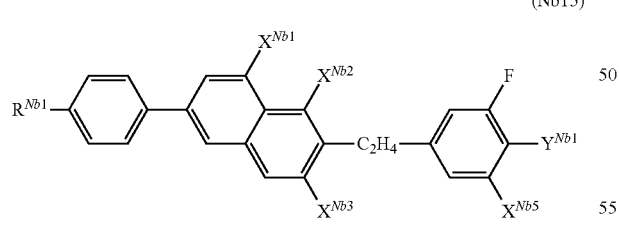
(Nb15)

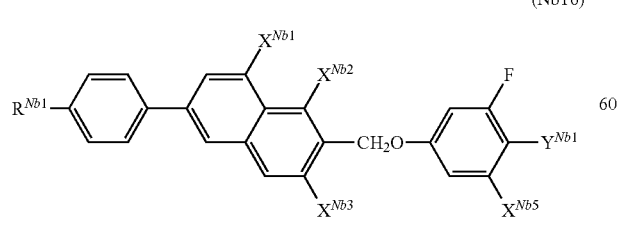
(Nb16)

(where $R^{Nb1}$ represents an alkyl group having 1 to 8 carbon atoms or an alkenyl group having 2 to 8 carbon atoms in which one or non-adjacent two or more —$CH_2$— in the groups may each be independently substituted with —C≡C—, —O—, —CO—, —COO—, or —OCO—; $X^{Nb1}$ to $X^{Nb5}$ each independently represent a hydrogen atom, a chlorine atom, or a fluorine atom; and $Y^{Nb1}$ represents a fluorine atom, a chlorine atom, a cyano group, a trifluoromethyl group, a fluoromethoxy group, a difluoromethoxy group, a trifluoromethoxy group, or a 2,2,2-trifluoroethyl group).

7. The liquid crystal composition according to claim 1, comprising at least one compound selected from compounds represented by, as the general formula (Pa), a general formula (P01) to a general formula (P80)

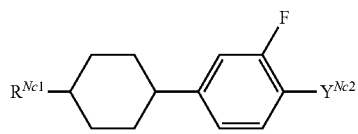
(P01)

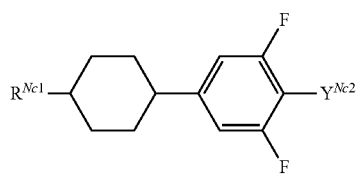
(P02)

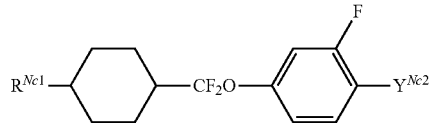
(P03)

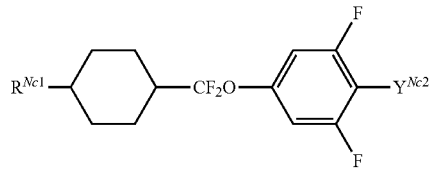
(P04)

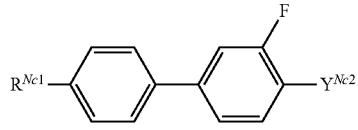
(P05)

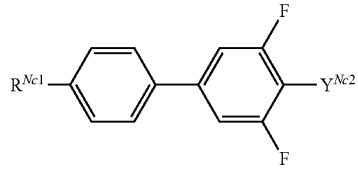
(P06)

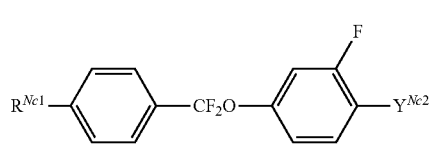
(P07)

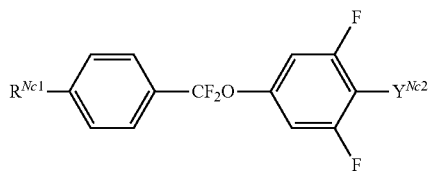 (P08)
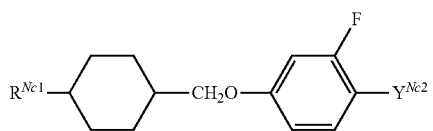 (P09)
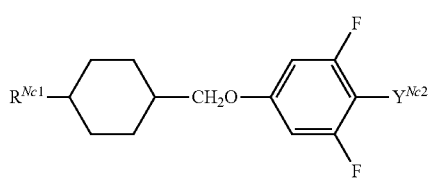 (P10)
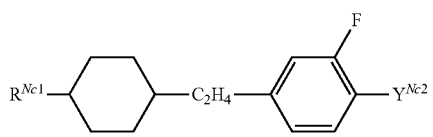 (P11)
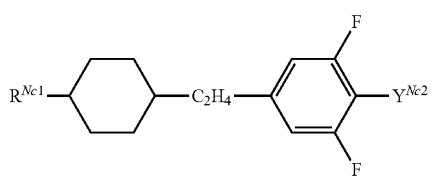 (P12)
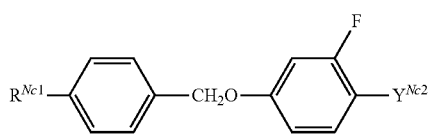 (P13)
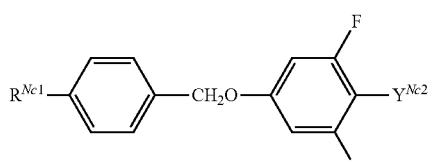 (P14)
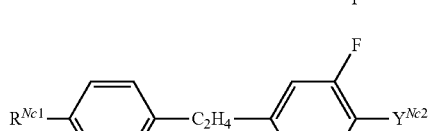 (P15)
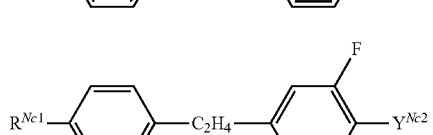 (P16)
 (P17)
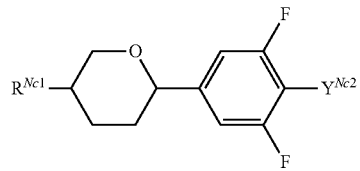 (P18)
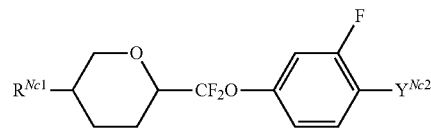 (P19)
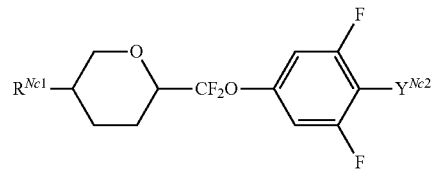 (P20)
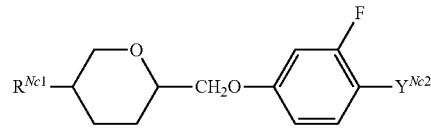 (P21)
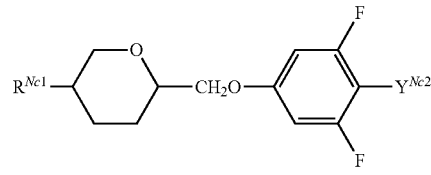 (P22)
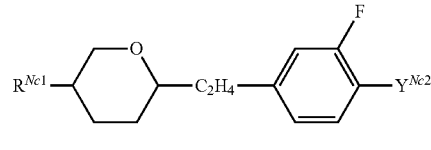 (P23)
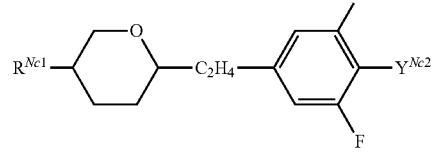 (P24)
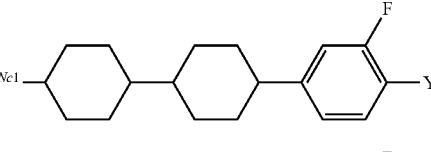 (P25)
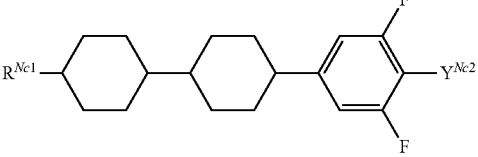 (P26)
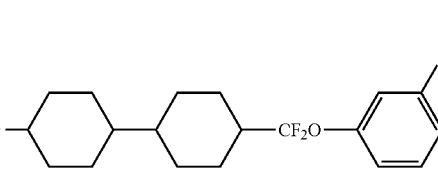 (P27)

(P28) 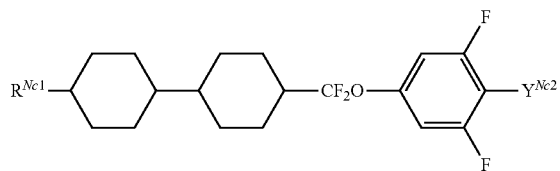
(P29) 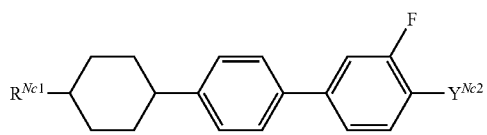
(P30) 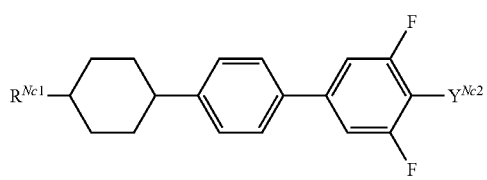
(P31) 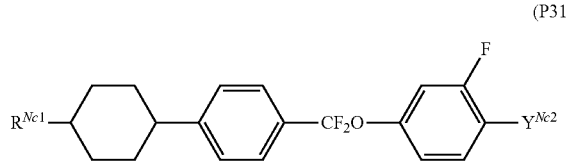
(P32) 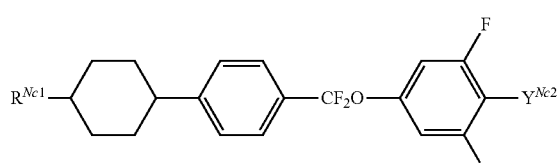
(P33) 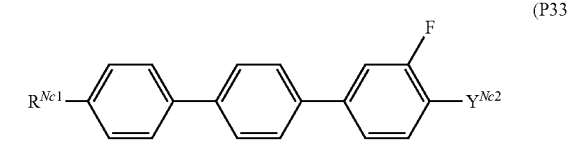
(P34) 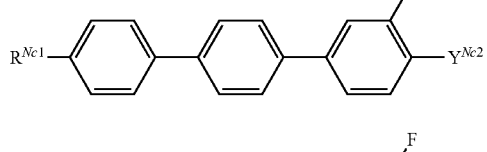
(P35) 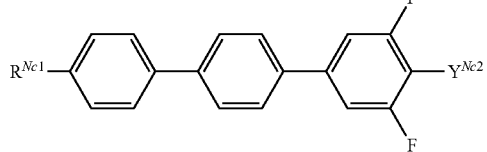
(P36) 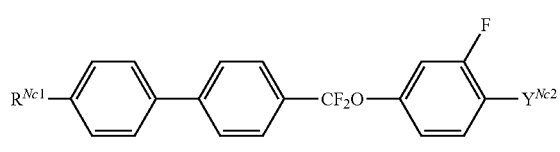
(P37) 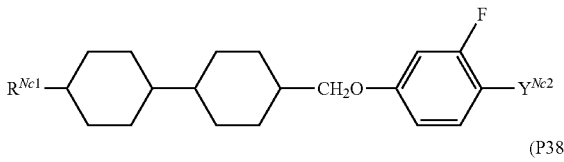
(P38) 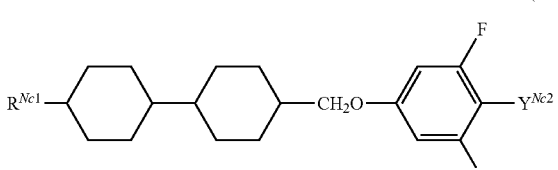
(P39) 
(P40) 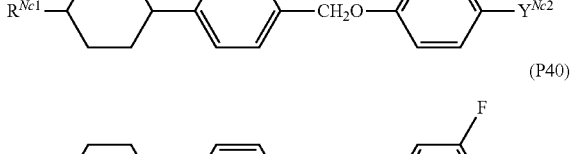
(P41) 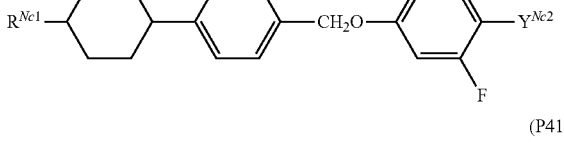
(P42) 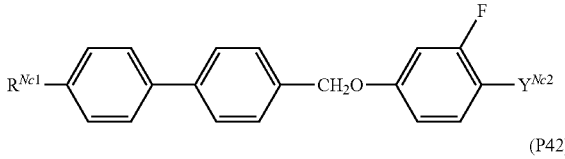
(P43) 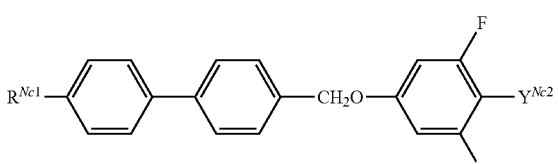
(P44) 
(P45) 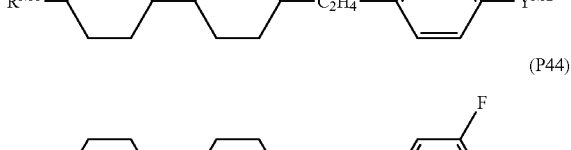

(P46)
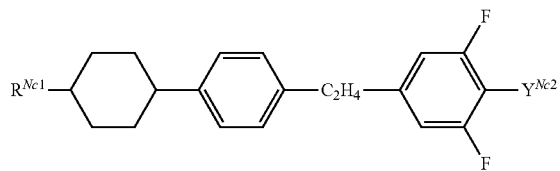
(P47)
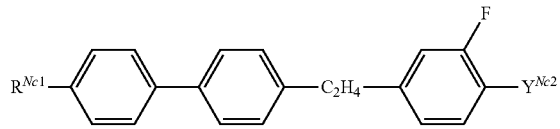
(P48)
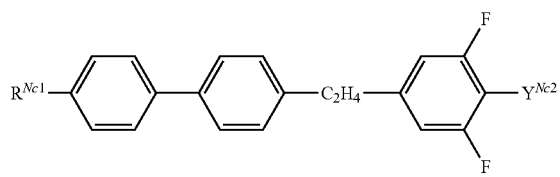
(P49)
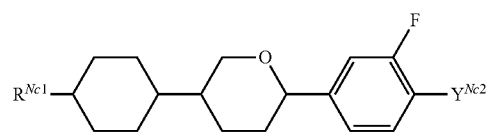
(P50)
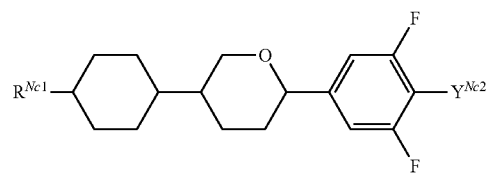
(P51)
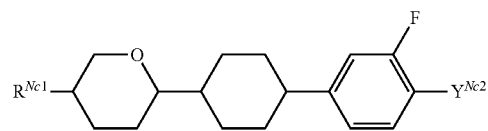
(P52)
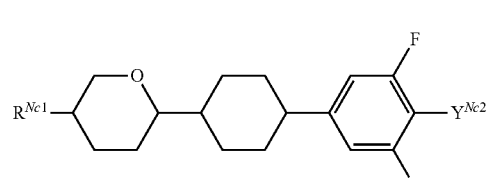
(P53)
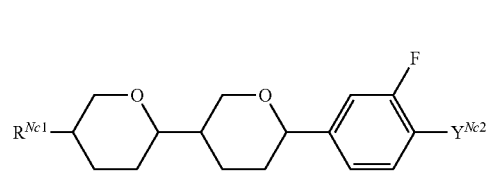
(P54)
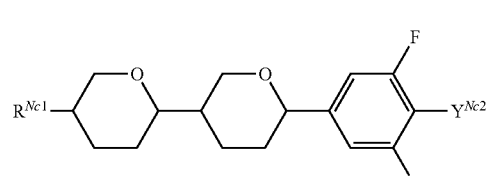
(P55)
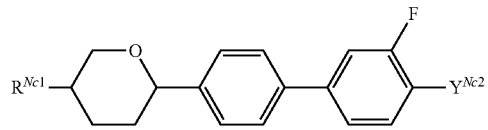
(P56)
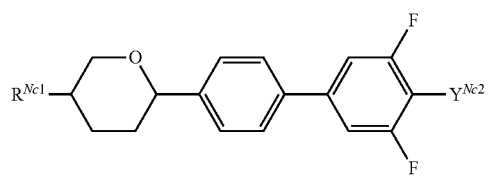
(P57)
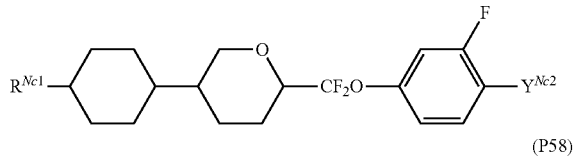
(P58)
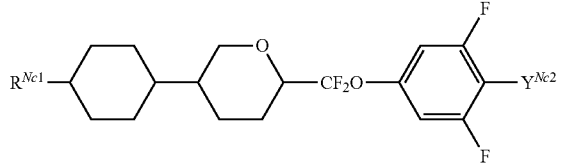
(P59)
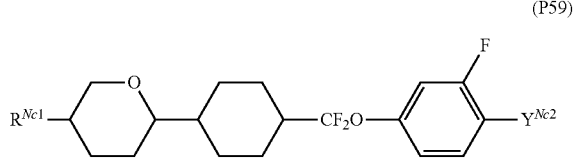
(P60)
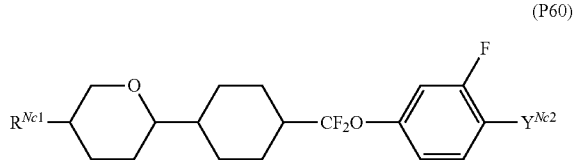
(P61)
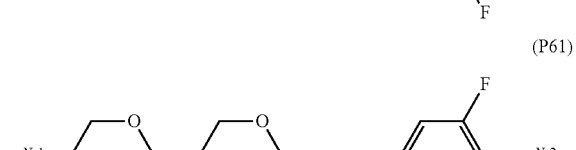
(P62)
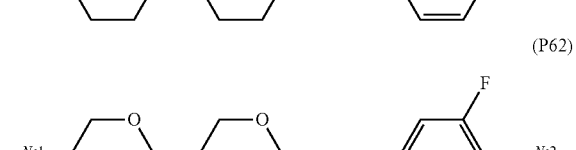
(P63)
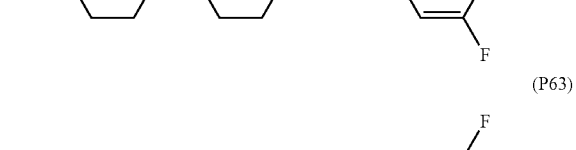
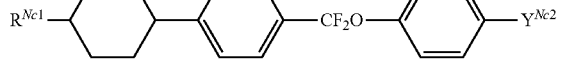

(P64) 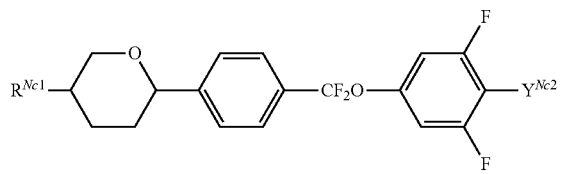
(P65) 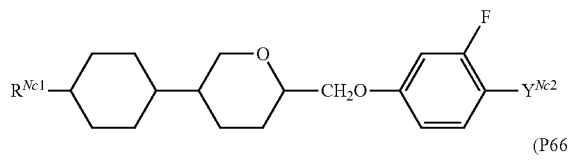
(P66) 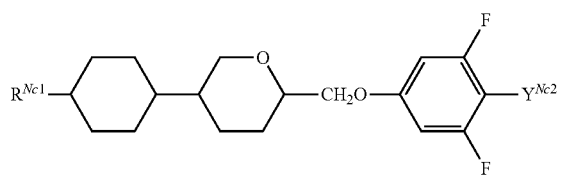
(P67) 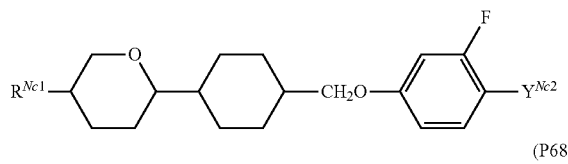
(P68) 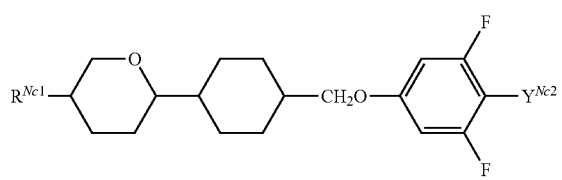
(P69) 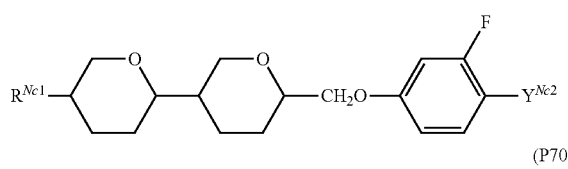
(P70) 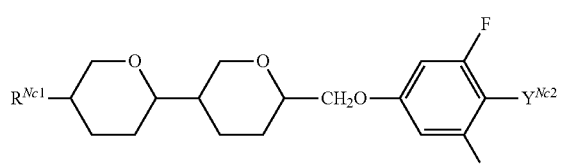
(P71) 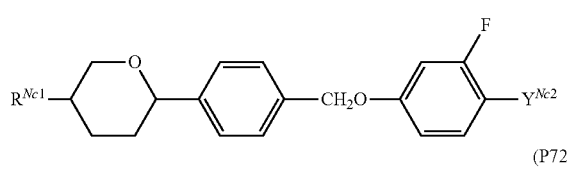
(P72) 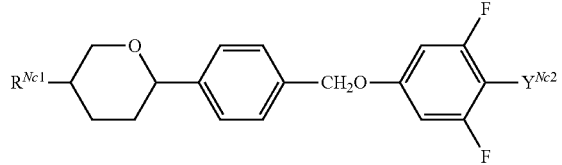
(P73) 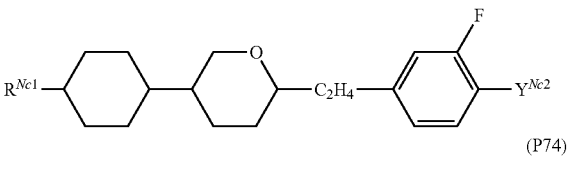
(P74) 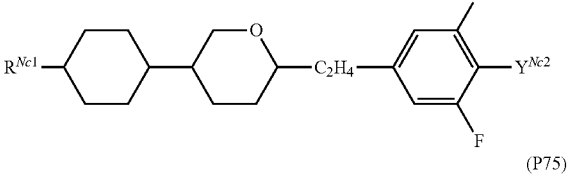
(P75) 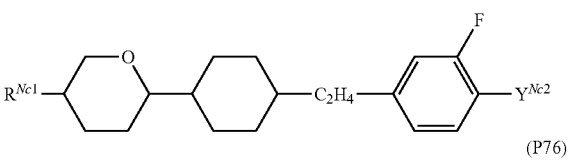
(P76) 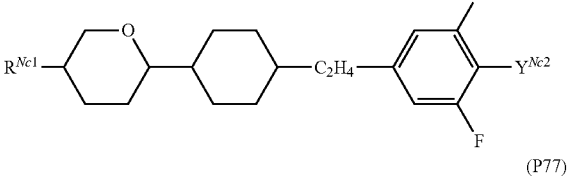
(P77) 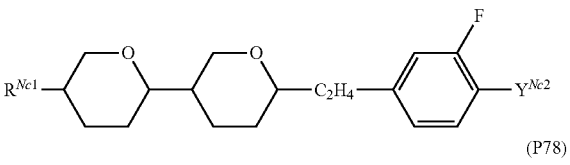
(P78) 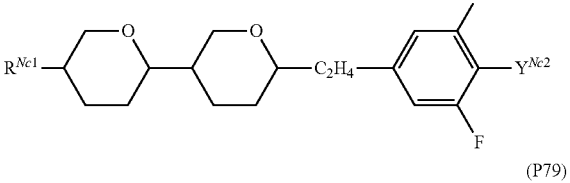
(P79) 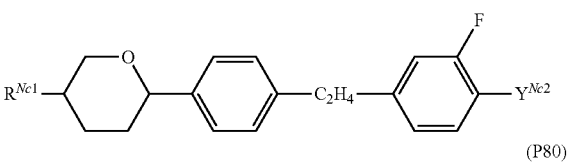
(P80) 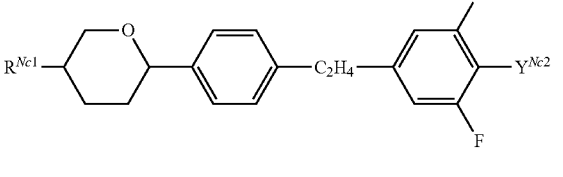
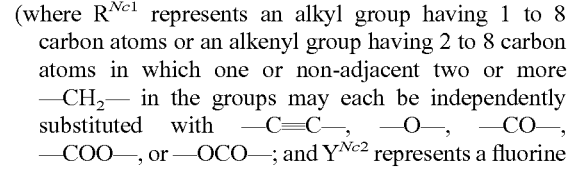
(where $R^{Nc1}$ represents an alkyl group having 1 to 8 carbon atoms or an alkenyl group having 2 to 8 carbon atoms in which one or non-adjacent two or more —CH$_2$— in the groups may each be independently substituted with —C≡C—, —O—, —CO—, —COO—, or —OCO—; and $Y^{Nc2}$ represents a fluorine atom, a chlorine atom, a cyano group, a trifluoromethyl group, a fluoromethoxy group, a difluoromethoxy group, a trifluoromethoxy group, or a 2,2,2-trifluoroethyl group).

8. The liquid crystal composition according to claim 1, further comprising, as a third component, at least one compound selected from a compound group represented by a general formula (III-A) to a general formula (III-J)

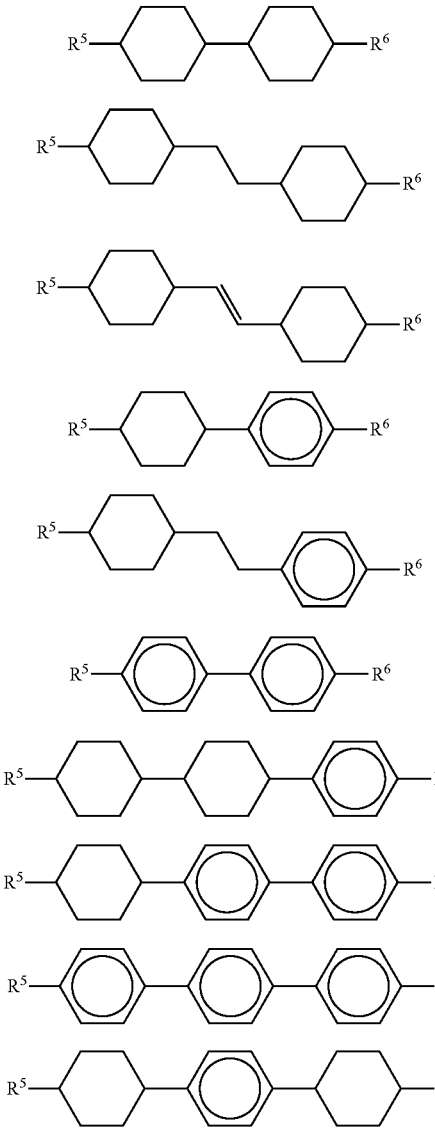

(where $R^5$ represents an alkyl group having 1 to 5 carbon atoms or an alkenyl group having 2 to 5 carbon atoms; $R^6$ represents an alkyl group having 1 to 5 carbon atoms, an alkoxyl group having 1 to 5 carbon atoms, an alkenyl group having 2 to 5 carbon atoms, or an alkenyloxy group having 2 to 5 carbon atoms; and compounds represented by the general formula (III-A) do not include a compound identical to the compound represented by the formula (Ix)).

9. The liquid crystal composition according to claim 1, comprising, as another component, at least one compound represented by a general formula (VIII-c) or a general formula (VIII-d)

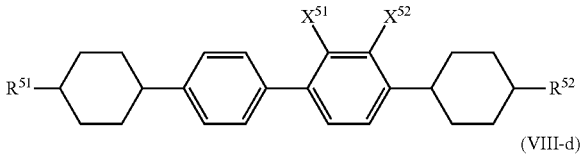

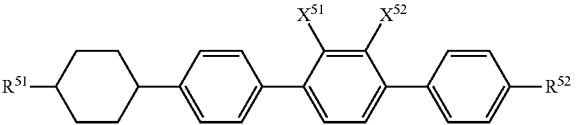

(where $R^{51}$ and $R^{52}$ each independently represent an alkyl group having 1 to 5 carbon atoms, an alkoxyl group having 1 to 5 carbon atoms, an alkenyl group having 2 to 5 carbon atoms, or an alkenyloxy group having 2 to 5 carbon atoms; and $X^{51}$ and $X^{52}$ each independently represent a fluorine atom, a chlorine atom, or a hydrogen atom).

10. The liquid crystal composition according to claim 1, further comprising a polymerizable compound represented by a general formula (XX)

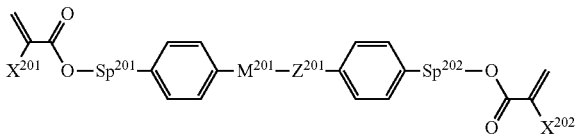

(where $X^{201}$ and $X^{202}$ each independently represent a hydrogen atom or a methyl group; $Sp^{201}$ and $Sp^{202}$ each independently represent a single bond, an alkylene group having 1 to 8 carbon atoms, or —O—$(CH_2)_s$— (where s represents an integer of 2 to 7 and the oxygen atom is bonded to the aromatic ring); $Z^{201}$ represents —OCH$_2$—, —CH$_2$O—, —COO—, —OCO—, —CF$_2$O—, —OCF$_2$—, —CH$_2$CH$_2$—, —CF$_2$CF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CY$^1$=CY$^2$— (where $Y^1$ and $Y^2$ each independently represent a fluorine atom or a hydrogen atom), —C≡C—, or a single bond; $M^{201}$ represents a 1,4-phenylene group, a trans-1,4-cyclohexylene group, or a single bond; and any hydrogen atom in all 1,4-phenylene groups in the formula may be substituted with a fluorine atom).

11. A liquid crystal display element comprising the liquid crystal composition according to claim 1.

12. An active-matrix-driving liquid crystal display element comprising the liquid crystal composition according to claim 1.

13. A liquid crystal display element employing a TN mode, an IPS mode, an FFS mode, or a PSA mode, the liquid crystal display element comprising the liquid crystal composition according to claim 1.

14. An active-matrix-driving liquid crystal display element comprising the liquid crystal composition according to claim 1.

* * * * *